(12) United States Patent
Ota et al.

(10) Patent No.: US 12,270,749 B2
(45) Date of Patent: Apr. 8, 2025

(54) IMAGING FLOW CYTOMETER

(71) Applicant: The University of Tokyo, Tokyo (JP)

(72) Inventors: Sadao Ota, Tokyo (JP); Masashi Ugawa, Tokyo (JP)

(73) Assignee: THE UNIVERSITY OF TOKYO, Tokyo (JP)

(*) Notice: Subject to any disclaimer, the term of this patent is extended or adjusted under 35 U.S.C. 154(b) by 274 days.

(21) Appl. No.: 17/924,135

(22) PCT Filed: Sep. 10, 2021

(86) PCT No.: PCT/JP2021/033328
§ 371 (c)(1),
(2) Date: Nov. 9, 2022

(87) PCT Pub. No.: WO2022/054908
PCT Pub. Date: Mar. 17, 2022

(65) Prior Publication Data
US 2023/0175949 A1 Jun. 8, 2023

(30) Foreign Application Priority Data
Sep. 10, 2020 (JP) ................................. 2020-152331

(51) Int. Cl.
*G01N 15/1434* (2024.01)
*G01N 15/1404* (2024.01)

(52) U.S. Cl.
CPC ..... *G01N 15/1434* (2013.01); *G01N 15/1404* (2013.01); *G01N 2015/142* (2013.01); *G01N 2015/1443* (2013.01)

(58) Field of Classification Search
CPC .......... G01N 15/1434; G01N 15/1404; G01N 2015/142; G01N 2015/1443;
(Continued)

(56) References Cited

U.S. PATENT DOCUMENTS 6,249,341 B1 6/2001 Basiji et al.
8,582,203 B2 11/2013 Dunsby
(Continued)

FOREIGN PATENT DOCUMENTS

CN 112179818 A 1/2021
EP 3187854 A1 7/2017
(Continued)

OTHER PUBLICATIONS

English Machine Translation of WO 2018199080 A1 (Year: 2018).*
(Continued)

*Primary Examiner* — David Z Huang
(74) *Attorney, Agent, or Firm* — XSENSUS LLP

(57) ABSTRACT

An imaging flow cytometer includes: a flow channel in which an observation object flows and a length in a width direction is longer than a length in a height direction; an acoustic element configured to apply acoustic waves as standing waves to the flow channel; a light source that irradiates the flow channel with illumination light; an image sensor configured to image at least a line included in a cross section of the observation object crossing a flow line direction which is a direction in which the observation object flows in the flow channel by measuring or imaging the observation object passing through a position irradiated with the illumination light; and circuitry configured to generate an image in which the observation object is scanned in the flow line direction on the basis of a plurality of captured images acquired by the imaging unit imaging the line in a time series.

7 Claims, 29 Drawing Sheets

(58) Field of Classification Search
CPC ......... G01N 15/1433; G01N 2015/025; G01N 2015/0294; G01N 15/0227; G01N 2015/1497; G01N 15/14
See application file for complete search history.

(56) References Cited

U.S. PATENT DOCUMENTS

| | | | |
|---|---|---|---|
| 2012/0086938 A1 | 4/2012 | Folkenberg | |
| 2014/0336062 A1* | 11/2014 | Graves | G01N 15/1404 506/7 |
| 2015/0192767 A1 | 7/2015 | Li et al. | |
| 2019/0056302 A1 | 2/2019 | Berezin et al. | |
| 2020/0057289 A1 | 2/2020 | Ugawa et al. | |

FOREIGN PATENT DOCUMENTS

| | | | |
|---|---|---|---|
| JP | 7-318476 A | 12/1995 | |
| JP | 2000-199744 A | 7/2000 | |
| JP | 2010-276338 A | 12/2010 | |
| JP | 5534214 B2 | 6/2014 | |
| JP | 2014-151260 A | 8/2014 | |
| JP | 2016-217888 A | 12/2016 | |
| JP | 2017-116558 A | 6/2017 | |
| JP | 2020-137429 A | 9/2020 | |
| WO | 2011/006525 A1 | 1/2011 | |
| WO | 2017/054839 A1 | 4/2017 | |
| WO | WO-2018199080 A1 * | 11/2018 | ............. G01N 15/14 |
| WO | 2020/213338 A1 | 10/2020 | |

OTHER PUBLICATIONS

Japanese Notice of Allowance issued Dec. 19, 2023 in corresponding Japanese Patent Application No. 2022-548354, 5 pages.
European Search Report issued Jul. 30, 2024 in European Patent Application No. 21866865.5.
Li et al., "Axial Plane Optical Microscopy", Scientific Reports, Springer Nature, vol. 4, No. 7253, Dec. 1, 2014, pp. 1-6.
Bukowska et al., "Assessment of the flow velocity of blood cells in a microfluidic device using joint spectral and time domain optical coherence tomography", Optics Express, OSA Publishing, vol. 21, No. 20, Oct. 1, 2013, pp. 24025-24038.
International Search Report mailed on Nov. 9, 2021, received for PCT Application PCT/JP2021/033328, filed on Sep. 10, 2021, 6 pages including English Translation.

* cited by examiner

FIG. 9
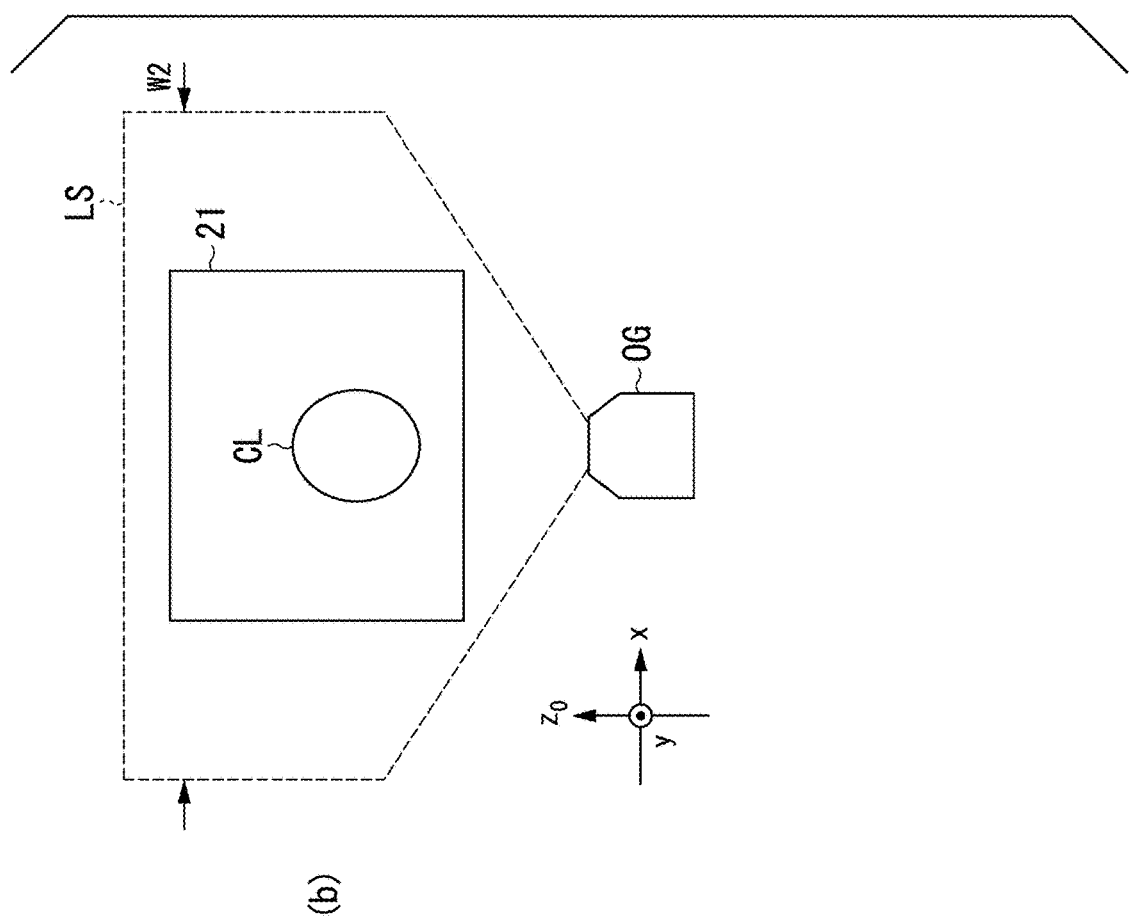
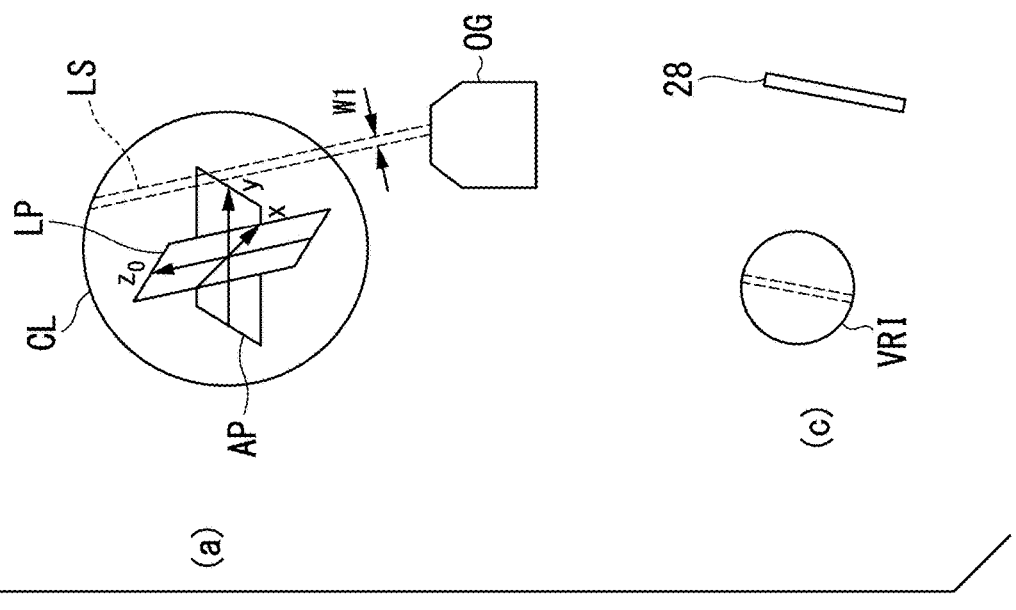

IMAGING FLOW CYTOMETER

CROSS-REFERENCE TO RELATED APPLICATIONS

The present application is based on PCT filing PCT/JP2021/033328, filed Sep. 10, 2021, which claims priority to Japanese Patent Applications No. 2020-152331, filed on Sep. 10, 2020, the entire contents of each are incorporated herein by reference.

TECHNICAL FIELD

The present invention relates to an imaging flow cytometer.

In the related art, a flow cytometry method of evaluating features of an observation object flowing in a flow channel by measuring light which is emitted from the observation object in response to irradiation of the observation object with illumination light and a flow cytometer using the flow cytometry method are known (for example, Patent Literature 1). In addition, a fluorescence microscope or an imaging cytometer that evaluates particulates such as cells and bacteria serving as observation objects using images is known.

As a type of flow cytometer, an imaging flow cytometer that images morphological information of particulates at a high speed at a throughput equivalent to that of a flow cytometer according to the related art is known (for example, Patent Literature 2). In this imaging flow cytometer, a measurement field which illumination light reaches is provided in a flow channel and cells pass through the measurement field. That is, in the imaging flow cytometer, capturing of a two-dimensional or three-dimensional image or measuring of cellular space information corresponding to the image is performed at the time of scanning.

A multifaceted optical microscope that irradiates a cell which is an observation object with belt-shaped excitation light and acquires an image of a plane at an angle different from an irradiation plane irradiated with the excitation light or a three-dimensional image of the observation object is known (for example, Patent Literature 3 and Patent Literature 4). A technique of axial plane optical microscopy (APOM) is used in a multifaceted optical microscope described in Patent Literature 4 (for example, Non-Patent Literature 1). APOM is a technique of a multifaceted optical microscope that directly images a cross section of an observation object which is parallel to an optical axis of an objective lens without performing scanning.

CITATION LIST

Patent Literature

Patent Literature 1

Japanese Patent No. 5534214

Patent Literature 2

U.S. Pat. No. 6,249,341

Patent Literature 3

United States Patent Application, Publication No. 2015/0192767

Patent Literature 4

U.S. Pat. No. 8,582,203

Non-Patent Literature

Non-Patent Literature 1

Tongcang Li, Sadao Ota, Jeongmin Kim, Zi Jing Wong, Yuan Wang, Xiaobo Yin, Xiang Zhang, "Axial plane optical microscopy." "Scientific Reports," Springer Nature, vol. 4, No. 7253, Dec. 1, 2014

Non-Patent Literature 2

Danuta M. Bukowska, Ladislav Derisi, Szymon Tamborski, Maciej Szkulmowski, Piotr Garstecki, Maciej Wojtkowski, "Assessment of the flow velocity of blood cells in a microfluidic device using joint spectral and time domain optical coherence tomography," "Optics Express," OSA Publishing, vol. 21, No. 20, p. 24025-24038, Oct. 1, 2013

SUMMARY OF INVENTION

Technical Problem

In the aforementioned imaging cytometer, a flow rate of a fluid flowing in a flow channel may vary in a width direction or a height direction of the flow channel. If nothing is done, a position of an observation object varies in the width direction or the height direction of the flow channel. As a result, variation in a velocity (a flow direction and a speed) or rotation of the observation object flowing in the flow channel occurs due to variation in Dow rate caused in the flow channel. As a result, the position or speed of the observation object in a direction perpendicular to a flow line direction at an imaging position may become unstable or the observation object may rotate. Accordingly, when the observation object is scanned in the flow line direction, imaging conditions may not be stable. The imaging conditions include a position, a rotation, and a velocity (a flow direction and a speed) of the observation object in the direction perpendicular to the flow line direction in the process of imaging.

The present invention was made in consideration of the aforementioned circumstances and provides an imaging flow cytometer that can stabilize imaging conditions when an observation object flowing in a flow channel is scanned in a flow line direction.

Solution to Problem

In order to achieve the aforementioned objective, according to an aspect of the present invention, an imaging flow cytometer is provided, including: a flow channel in which an observation object flows and a length in a width direction is longer than a length in a height direction; an acoustic element configured to apply acoustic waves as standing waves to the flow channel; a light source configured to irradiate the flow channel with illumination light; an imaging unit configured to image at least a line included in a cross section of the observation object crossing a flow line direction which is a direction in which the observation object flows in the flow channel by measuring or imaging the observation object passing through a position irradiated with the illumination light; and a scanned image-generating unit configured to generate an image in which the observation object is scanned in the flow line direction on the basis of a plurality of captured images acquired by the imaging unit imaging the line in a time series.

In the imaging flow cytometer according to the aspect of the present invention, the number of nodes of the standing waves in the height direction may be one, and the number of nodes of the standing waves in the width direction may be zero.

In the imaging flow cytometer according to the aspect of the present invention, the number of nodes of the standing waves in the height direction may be one, and the number of nodes of the standing waves in the width direction may be one or more.

In the imaging flow cytometer according to the aspect of the present invention, a plurality of the observation objects arranged in the width direction may flow in the flow channel.

Advantageous Effects of Invention

According to the present invention, it is possible to stabilize imaging conditions when an observation object flowing in a flow channel is scanned in a flow line direction.

BRIEF DESCRIPTION OF DRAWINGS

FIG. 9 is a diagram illustrating an example of a cross section of a cell which is imaged by an image sensor according to the first embodiment of the present invention.

DESCRIPTION OF EMBODIMENTS

First Embodiment

Figure 1:
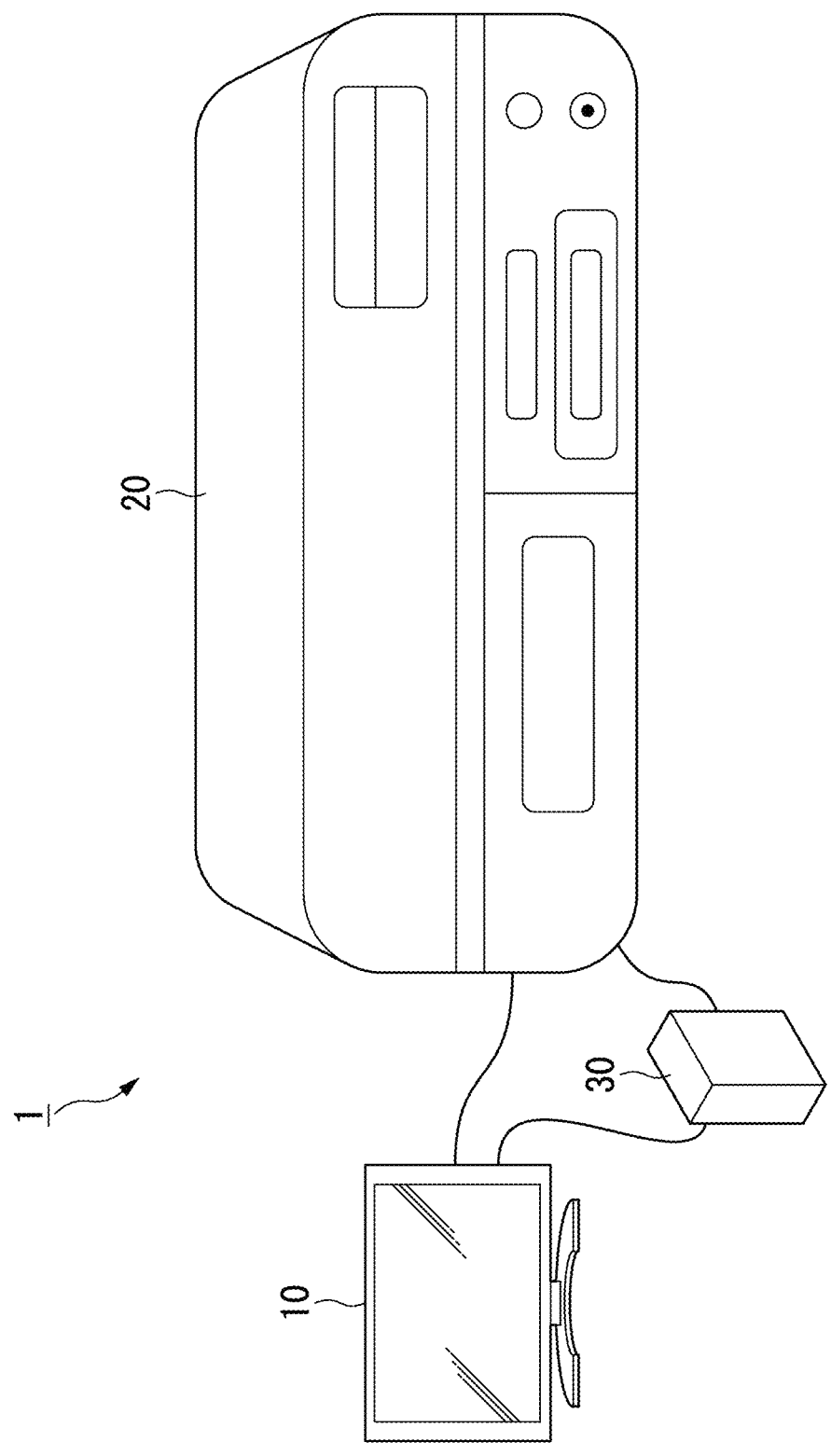
FIG. 1 is a diagram illustrating an example of a configuration of a cytometry system according to a first embodiment of the present invention.

Hereinafter, embodiments of the present invention will be described in detail with reference to the accompanying drawings. FIG. 1 is a diagram illustrating an example of a configuration of a cytometry system 1 according to this embodiment.

The cytometry system 1 includes an imaging flow cytometer 20, an analysis device 30, and a display unit 10. The imaging flow cytometer 20 includes a flow channel in which an observation object flows. In this embodiment, it is assumed that the observation object is cells, but the observation object is not limited to cells. The observation object may be particulates such as bacteria.

As a microscope that is used for the imaging flow cytometer 20 to observe the observation object, a fluorescent microscope or various types of microscopes not requiring fluorescence staining are used. When a fluorescence microscope is used for the imaging flow cytometer 20, the observation object undergoes fluorescence staining. When various types of microscopes not requiring fluorescence staining are used for the imaging Dow cytometer 20, the observation object does not undergo fluorescence staining. Examples of the various types of microscopes not requiring fluorescence staining include a bright-field microscope, a dark-field microscope, a phase-difference microscope, a phase microscope, a light-scattering microscope, a Raman scattering light microscope, and an absorptive phase microscope. In an imaging flow cytometer using a microscope not requiring fluorescence staining, a label-free imaging technique of capturing an image of an observation object not having undergone fluorescence staining is used, and cells, bacteria, and the like can be noninvasively observed. Imaging used for the imaging flow cytometer 20 to observe an observation object is not limited to the aforementioned description, and various types of imaging using visible light, electromagnetic waves other than visible light, heat, oscillatory waves, or the like may be used.

The imaging flow cytometer 20 generates a three-dimensional image of cells flowing in the flow channel. The analysis device 30 analyzes the three-dimensional image generated by the imaging flow cytometer 20. The analysis device 30 performs, for example, sorting of cells reconstructed as the three-dimensional image or reading of various types of information of the cells by analyzing the three-dimensional image. The analysis device 30 is, for example, a personal computer (PC). The analysis device 30 is suitably used for nondestructive cell analysis.

The display unit 10 displays the three-dimensional image generated by the imaging flow cytometer 20 or analysis results from the analysis device 30. The display unit 10 includes, for example, a liquid crystal display and displays various images. Images displayed on the display unit 10 include a three-dimensional image of cells generated by the imaging flow cytometer 20.

Functional Configuration of Imaging Flow Cytometer 20

A functional configuration of the imaging flow cytometer 20 will be described below with reference to FIG. 2.

Figure 2:
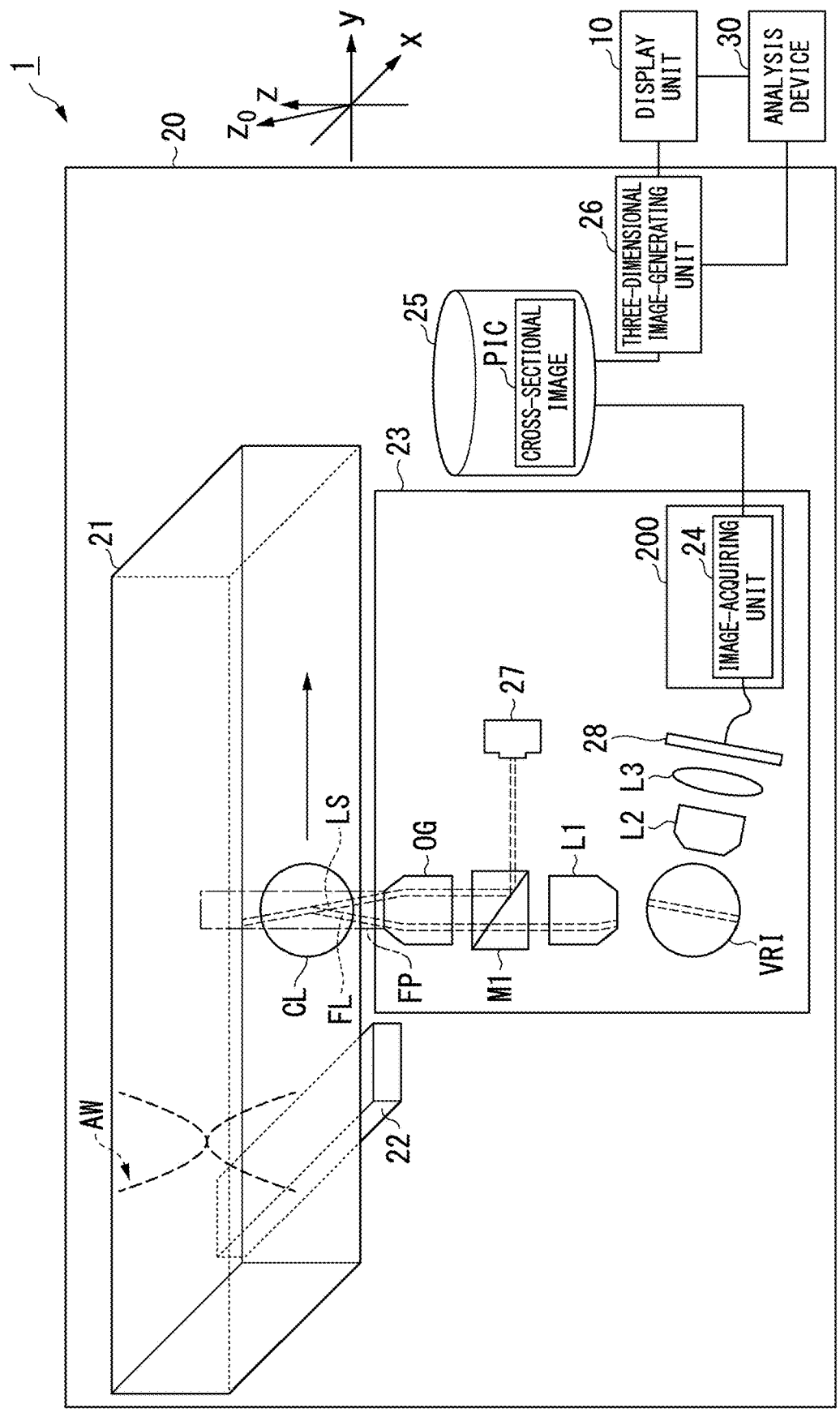
FIG. 2 is a diagram illustrating an example of a functional configuration of the cytometry system according to the first embodiment of the present invention.

FIG. 2 is a diagram illustrating an example of the functional configuration of the cytometry system 1 according to this embodiment. In FIG. 2, an xy, coordinate system is illustrated as a three-dimensional orthogonal coordinate system. In this embodiment, the x-axis direction is a width direction of the flow channel 21. The y-axis direction is a direction in which cells CL flow in the flow channel 21. The cells CL flow to the +y side in the y-axis direction. The z-axis direction is a direction perpendicular to the flow channel 21 and is a height direction of the flow channel 21.

The imaging flow cytometer 20 includes a flow channel 21, an acoustic element 22, an imaging unit 23, a storage unit 25, and a three-dimensional image-generating unit 26.

Figure 3:
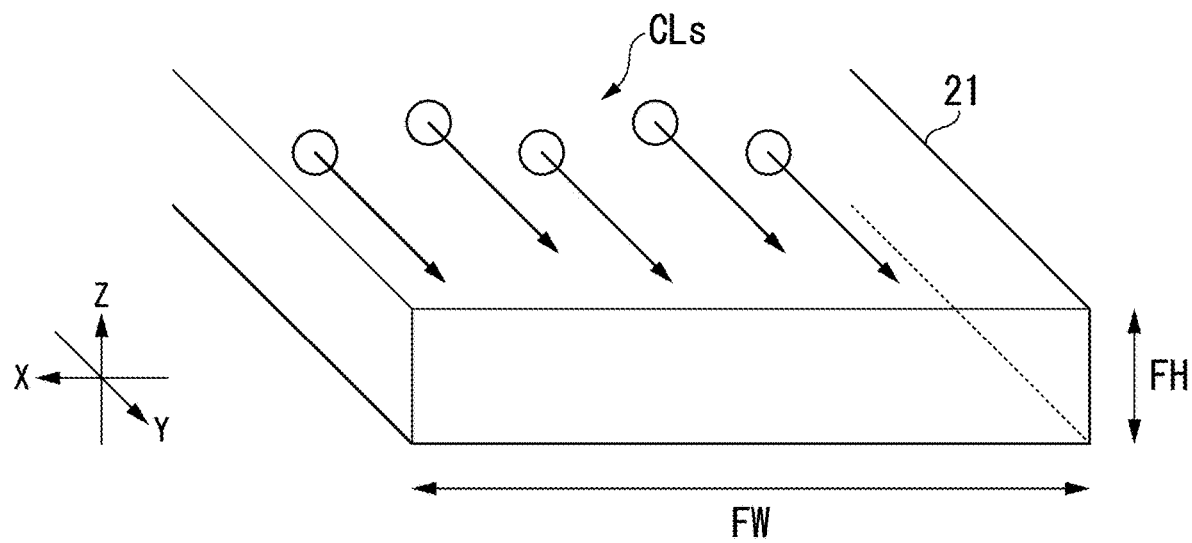
FIG. 3 is a diagram illustrating an example of a configuration of a flow channel according to the first embodiment of the present invention.

The flow channel 21 and the acoustic element 22 will be described below with reference to FIGS. 3 to 8. FIG. 3 is a diagram illustrating an example of a configuration of the flow channel 21 according to this embodiment. An observation object flows in the flow channel 21. The observation object flows along with a fluid flowing in the flow channel 21. In this embodiment, a plurality of observation objects which are arranged in the width direction of the flow channel 21 flow in the flow channel 21.

The arranging of a plurality of observation objects in the width direction means that a plurality of observation objects have substantially the same positions in the height direction and the plurality of observation objects are arranged in a line in the width direction. An interval between neighboring observation objects may be arbitrary. When a plurality of observation objects are arranged in the width direction, it is preferable that positions of the plurality of observation objects in the length direction of the flow channel 21 be different. When a plurality of observation objects are arranged in the width direction, it is preferable that at least a certain observation object and another observation object out of the plurality of observation objects have an overlapping part in the length direction of the flow channel 21 in the positions in the length direction of the plurality of observation objects. In the example illustrated in FIG. 3, a plurality of cells CLs as the observation objects are arranged in the width direction of the flow channel 21 and flow in the flow channel 21.

One observation object may flow in the flow channel 21.

In the flow channel 21, a width-direction length FW is longer than a height-direction length FH. Here, when a ratio of the width-direction length of the flow channel to the height-direction length is very large, a flow rate distribution in the width direction of the flow channel is constant regardless of the positions in the width direction (for example, see Non-Patent Literature 2). On the other hand, in this case, a flow rate distribution in the height direction varies greatly depending on the positions in the height direction.

Flow Rate Distribution

Figure 4:
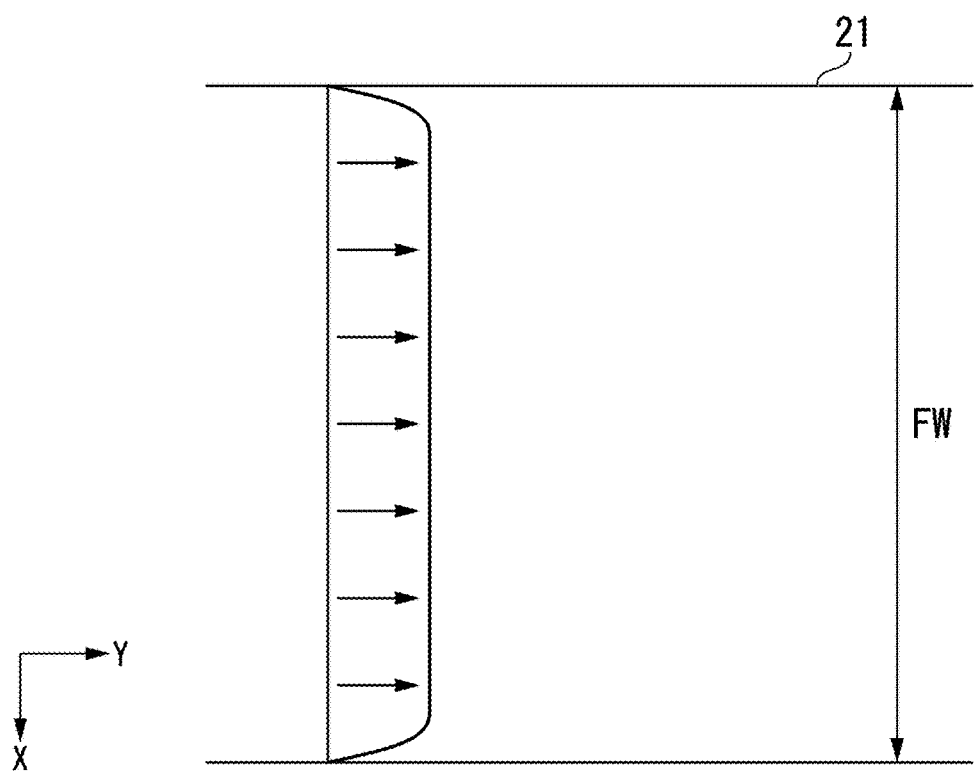
FIG. 4 is a diagram illustrating an example of a flow rate distribution in a width direction in the flow channel according to the first embodiment of the present invention.

FIG. 4 illustrates an example of a flow rate distribution in the width direction in the flow channel 21. In the flow channel 21, since the width-direction length FW is longer than the height-direction length FH, the flow rate distribution in the width direction is almost constant regardless of the positions in the width direction (the x-axis direction) except for the vicinity of walls of the flow channel 21.

Figure 5:
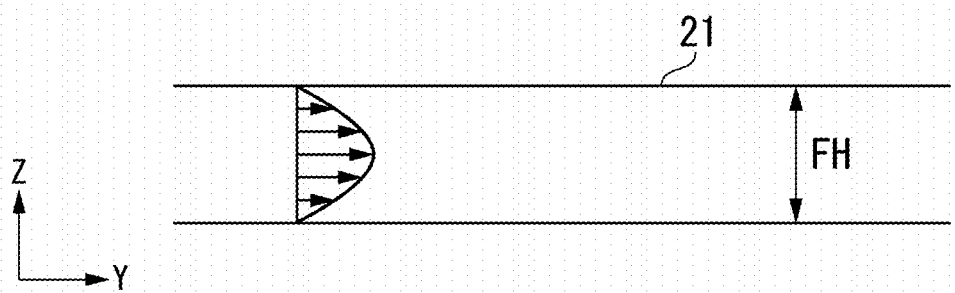
FIG. 5 is a diagram illustrating an example of a flow rate distribution in a height direction in the flow channel according to the first embodiment of the present invention.

FIG. 5 illustrates an example of a flow rate distribution in the height direction in the flow channel 21. In the flow channel 21, the flow rate distribution in the height direction varies greatly depending on the positions in the height direction (the z-axis direction). Here, a flow rate in the height direction becomes higher as it becomes farther from the walls of the flow channel 21. On the other hand, the flow rate in the height direction becomes lower as it becomes closer to the walls of the flow channel 21. Accordingly, the flow rate in the height direction has a maximum value of a central position in the height direction (the z-axis direction).

In this way, in the flow channel 21, the flow rate in the height direction can vary. Here, original (initial) positions in the height direction of a plurality of cells CLs flowing in the flow channel 21 vary due to various other causes (for example, gravitational force) in addition to the flow rate distribution in the height direction. As a result, each of a plurality of cells CLs flowing in the flow channel 21 can change a velocity (a direction and a speed) or can rotate due to the flow rate distribution in the height direction. Therefore, a position or a direction of each of the plurality of cells CLs in a direction perpendicular to the flow line direction varies with respect to the imaging unit 23 in the process of imaging the plurality of cells CLs.

When the position in the direction perpendicular to the flow line direction of each of the plurality of cells CLs is varied, some of the plurality of cells CLs may pass through a position other than a position imaged by an image sensor 28 provided in the imaging unit 23. In this case, the number of cells per frame decreases.

In the imaging flow cytometer 20, the positions of the observation objects in the height direction of the flow channel 21 are arranged using acoustic waves AW from the acoustic element 22. The acoustic element 22 includes, for example, a transducer.

Figure 6:
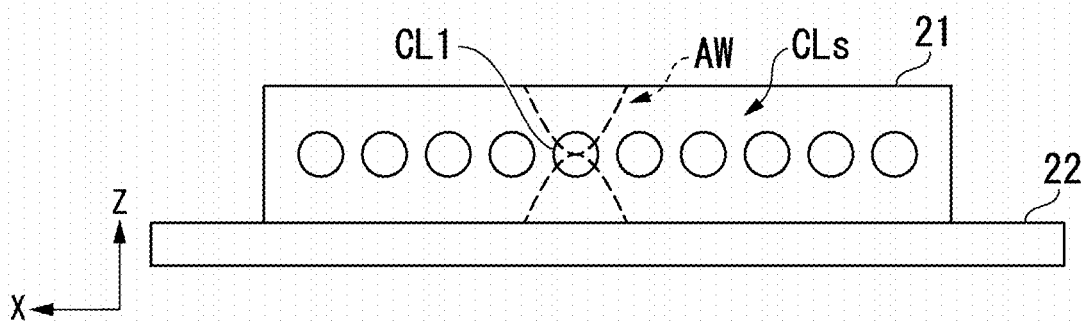
FIG. 6 is a diagram illustrating an example in which a plurality of cells flowing in the flow channel are arranged in the height direction due to acoustic waves according to the first embodiment of the present invention.

FIG. 6 illustrates an example in which a plurality of cells CLs flowing in the flow channel 21 are arranged in the height direction due to acoustic waves AW according to this embodiment. The acoustic element 22 applies acoustic waves AW to the flow channel 21 as standing waves. A wavelength of the acoustic waves AW is determined depending on the height of the flow channel 21.

The plurality of cells CLs are arranged to gather at a node of the standing waves of acoustic waves due to a sound effect. A method of gathering observation objects at a node of standing waves of acoustic waves due to a sound effect is referred to as acoustic focusing. Acoustic waves AW applied from the acoustic element 22 are, for example, ultrasonic waves. The acoustic waves AW applied from the acoustic element 22 may be acoustic waves with a lower frequency than ultrasonic waves.

In this embodiment, the number of nodes of the standing waves of acoustic waves AW is, for example, one in the height direction. The position of the node of the standing waves of acoustic waves AW is a central position in the height direction of the flow channel 21. The wavelength of the acoustic waves AW is the same as the height of the flow channel 21.

Since the number of nodes of the standing waves of acoustic waves AW is one in the height direction, a plurality of cells CLs are arranged in a line at the central position in the height direction. For example, an amplitude pattern of acoustic waves AW at a position in the vicinity of a cell CLI out of the plurality of cells CLs is illustrated in FIG. 6. Similarly, the standing waves of acoustic waves AW have anode at the central position in the height direction of the flow channel 21 at another position in the width direction of the flow channel 21.

On the other hand, the number of nodes of the standing waves of acoustic waves AW is, for example, zero in the width direction. In other words, the acoustic waves AW do not form standing waves in the width direction.

Figure 7:
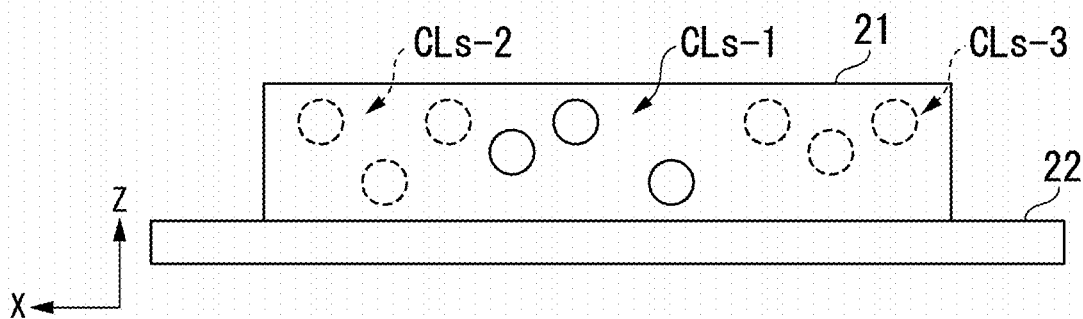
FIG. 7 is a diagram illustrating an example in which a plurality of cells flow in the flow channel when an acoustic element is not applying acoustic waves to the flow channel according to the first embodiment of the present invention.

For the purpose of comparison, an example in which a plurality of cells CLs flow in the flow channel 21 when the acoustic element 22 is not applying acoustic waves AW to the flow channel 21 is illustrated in FIG. 7. In FIG. 7, a cross section in the length direction (the y-axis direction) of the flow channel 21 at a certain time t1 is illustrated. A plurality of cells CLs-1 are cells with high speeds flowing in the vicinity of the center in the width direction (the x-axis direction) of the flow channel 21 out of the plurality of cells CLs. The cells CLs-2 and CLs-3 are cells with low speeds flowing at positions far from the center in the width direction (the x-axis direction) of the flow channel 21 out of the plurality of cells CLs. The cells CLs-2 and CLs-3 with low speeds flow upstream in comparison with the cells CLs-1 with high speeds at the time t1, and do not reach the position of the cross section illustrated in FIG. 7.

The positions of the plurality of cells CLs in the height direction (the z-axis direction) of the flow channel 21 are not aligned due to the flow rate distribution in the height direction.

Figure 8:
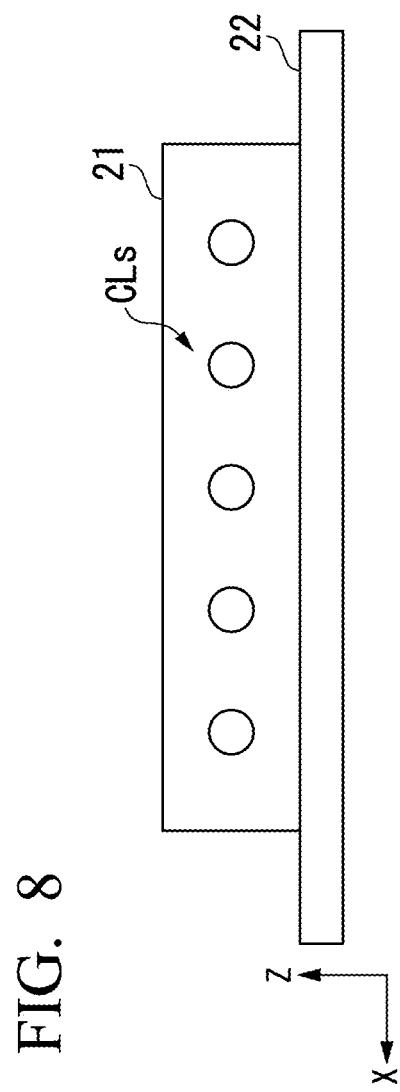
FIG. 8 is a diagram illustrating an example in which a plurality of cells flow in the flow channel when the number of nodes of standing waves of acoustic waves in the width direction is one or more according to the first embodiment of the present invention.

As described above, it is assumed in this embodiment that the number of nodes of the standing waves of acoustic waves AW is zero in the width direction, but the present invention is not limited thereto. The number of nodes of the standing waves of acoustic waves AW may be one or more in the width direction. An example in which a plurality of cells CLs flow in the flow channel 21 when the number of nodes of standing waves of acoustic waves AW in the width direction is one or more is illustrated in FIG. 8. In FIG. 8, for example, the number of nodes of the standing waves of acoustic waves AW is five in the width direction. The plurality of cells CLs are arranged at the positions of the nodes in the width direction of the standing waves in the width direction due to the sound effect.

When there is a node of standing waves in the width direction, a plurality of cells CLs flowing in the flow channel 21 pass through the position of the node in the width direction. Accordingly, the number of cells CLs arranged in the width direction is equal to the number of nodes of standing waves in the width direction. That is, the nodes of standing waves in the width direction limit the number of cells CLs arranged in the width direction.

While the nodes of standing waves in the width direction limit the number of cells CLs arranged in the width direction, the nodes of standing waves in the width direction can set a distance between neighboring cells out of the plurality of cells CLs arranged in the width direction to be equal to or longer than a predetermined distance. Accordingly, the nodes of standing waves in the width direction can curb interaction between the plurality of cells CLs.

On the other hand, in this embodiment, since the number of nodes of standing waves of acoustic waves AW is zero in the width direction, the number of cells CLs arranged in the width direction is not limited by the number of nodes. In this embodiment, the number of cells CLs arranged in the width direction is limited by the sizes of the plurality of cells CLs and the width of the flow channel 21.

A position at which the acoustic element 22 is provided will be described below with reference back to FIG. 2.

The acoustic element 22 is provided at a position which is upstream (on the −y side) from the position at which the imaging unit 23 is provided in the length direction of the flow channel 21 and which is separated by a predetermined distance from the position. Accordingly, the standing waves of acoustic waves AW emitted from the acoustic element 22 occur at a position upstream (on the −y side) from the position of the imaging unit 23.

When a plurality of cells CLs arranged in the height direction by the acoustic waves AW pass through the position to which the acoustic waves AW are applied, the cells are affected by the flow rate distribution on the downstream side. That is, variation in position or rotation can occur in a plurality of cells CLs arranged once on the downstream side of the position to which acoustic waves AW are applied. In the imaging flow cytometer 20, the imaging unit 23 is disposed at a position which is upstream from the position at which variation in position or rotation occurs in a plurality of cells CLs arranged once. Accordingly, the imaging unit 23 images a state in which the plurality of cells CLs are arranged in the height direction.

In this way, a distance between the acoustic element 22 and the imaging unit 23 in the length direction of the flow channel 21 is shorter to such an extent that arrangement of a plurality of observation objects due to the sound effect of acoustic waves AW from the acoustic element 22 is maintained.

Since the acoustic element 22 is provided at a position which is upstream (on the −y side) from the position at which the imaging unit 23 is provided in the length direction of the flow channel 21 and which is separated by a predetermined distance from the position, the appearance of the acoustic element 22 is not reflected in an image captured by the imaging unit 23.

The imaging unit 23 includes a light source 27, an objective lens OG, an image sensor 28, a first optical element L1, a second optical element L2, a third optical element L3, and a control unit 200.

The light source 27 irradiates the flow channel 21 with belt-shaped illumination light LS. Specifically, the light source 27 irradiates the flow channel 21 with belt-shaped coherent light. The belt-shaped illumination light LS is illumination light obtained by narrowing coherent light into a belt shape. The belt-shaped illumination light is coherent light with a width longer than a diameter of a sample in the x-axis direction and with a thickness adjusted to be less than the diameter of the sample in the y-axis direction. In this embodiment, the light source 27 irradiates the flow channel 21 with belt-shaped illumination light LS via a dichroic mirror M1 and the objective lens OG. The illumination light LS may be coherent light or incoherent light. In this embodiment, illumination light LS emitted from the light source 27 is, for example, coherent light.

The light source 27 irradiates the flow channel 21 with illumination light LS via the dichroic mirror M1 and the objective lens OG.

In the following description, the position of the flow channel 21 irradiated with illumination light LS is also referred to as an irradiation position. A cell CL passing through the irradiation position emits light L when it is irradiated with illumination light LS. For example, when the cell CL undergoes fluorescence staining, excitation light is used as the illumination light IS, and the cell CL emits light due to excitation of fluorescent molecules with the illumination light LS which is the excitation light. The emitted light is fluorescence and the light L is fluorescence.

The imaging unit 23 images cells CL passing through the position irradiated with illumination light LS. The imaging unit 23 images, for example, light L emitted from the cells CL passing through the position irradiated with the illumination light LS. Accordingly, the imaging unit 23 captures an image of a cross section of a cell CL. Here, a cross section is a plane from which the cell CL emits light L in response to the illumination light LS. In other words, a cross section is a plane crossing the direction in which the cell CL flows in the flow channel 21. For example, a configuration of an optical system that images a cross section of a cell is the same as the configurations disclosed in the specification of United States Patent Application, Publication No. 2015/0192767 and the specification of U.S. Pat. No. 8,582,203. The imaging unit 23 may measure spatial information of the cell CL. Depending on an imaging type with which the imaging flow cytometer 20 observes an observation object, the imaging unit 23 may use visible light, electromagnetic waves other than visible light, heat, oscillatory waves, or the like for measurement or imaging.

The objective lens OG collects light L from the cells CL. The objective lens OG is an objective lens that is disposed at a position at which a focal point thereof is placed at the irradiation position. In the following description, the position at which a focal point is placed at the irradiation position is also referred to as a focal position FP. The objective lens OG may be a dry objective lens or may be an immersion objective lens. The immersion objective lens may be an oil-immersion lens or a water-immersion lens.

The light collected by the objective lens OG is focused on the image sensor 28 via the first optical element L1, the second optical element L2, and the third optical element L3. In this example, the light collected by the objective lens OG is focused as an image VRI via the first optical element L1. The image VRI is an image of across section of a cell CL in a plane including the x-axis direction and the z0-axis direction. Here, the 20 axis is a direction in which belt-shaped illumination light LS collected by the objective lens OG is incident on the cell CL. The direction in which the belt-shaped illumination light LS is incident on the cell CL is inclined by a predetermined angle with respect to the z-axis direction. That is, the z0-axis is inclined by the predetermined angle with respect to the z axis. The image sensor 28 captures the image VRI via the second optical element L2 and the third optical element L3.

Cross Sections

An example of a cross section of a cell CL which is imaged by the image sensor 28 will be described below with reference to FIG. 9.

FIG. 9 is a diagram illustrating a cross section of a cell CL which is imaged by the image sensor 28. (a) of FIG. 9 is a diagram illustrating a positional relationship between illumination light LS and a cell CL. Illumination light LS emitted from the light source 27 is applied in a z0-axis direction.

(b) of FIG. 9 is a diagram illustrating a view of the cell CL in (a) of FIG. 9 in the y-axis direction. The illumination light LS spreads in a belt shape in the z0-axis direction and the x-axis direction. The cell CL flows in the flow channel 21 and passes through the illumination light LS spreading in a belt shape. Here, a width W1 of the illumination light LS illustrated in (a) of FIG. 9 is less than a width W2 of the illumination light LS illustrated in (b) of FIG. 9. Specifically, the width W1 ranges from 2 μm to 3 μm.

(c) of FIG. 9 is a diagram illustrating a positional relationship between the image sensor 28 and an image VRI which is a cross-sectional image of the cell CL. The image sensor 28 is parallel to the image VRI. The image sensor 28 captures the image VRI in a direction (that is, a direction of an optical axis of the second optical element 12 and the third optical element L3 illustrated in FIG. 2) perpendicular to the image VRI.

Description of the configuration of the imaging flow cytometer 20 will be continued with reference back to FIG. 2.

The image sensor 28 images a cross section of a cell CL. Here, the image sensor 28 is, for example, a camera in which pixels are arranged in a longitudinal direction and a lateral direction. The image sensor 28 can acquire light intensity of only a pixel array in an area on which an image is formed out of the pixels arranged in the longitudinal direction and the lateral direction. For example, when pixels of N rows in the longitudinal direction and pixels of N columns in the lateral direction are arranged, the image sensor 28 acquires light intensity of only a pixel array corresponding to M rows (where M is less than N) at the center in the longitudinal direction. That is, the image sensor 28 acquires light intensity of only M×N pixels. Accordingly, the image sensor 28 can decrease a period of time for acquiring light intensity of a pixel array in an area on which an image is not formed in comparison with an image sensor that acquires light intensity of the pixels in both the area on which an image is formed and the area on which an image is not formed. It is possible to decrease a period of time of image processing for generating a captured image on the basis of the light intensity acquired from the image sensor 28. Accordingly, the image sensor 28 can quickly acquire an image.

The image sensor 28 may be a camera that acquires light intensity of the pixels in both the area on which an image is formed and the area on which an image is not formed.

Figure 10:
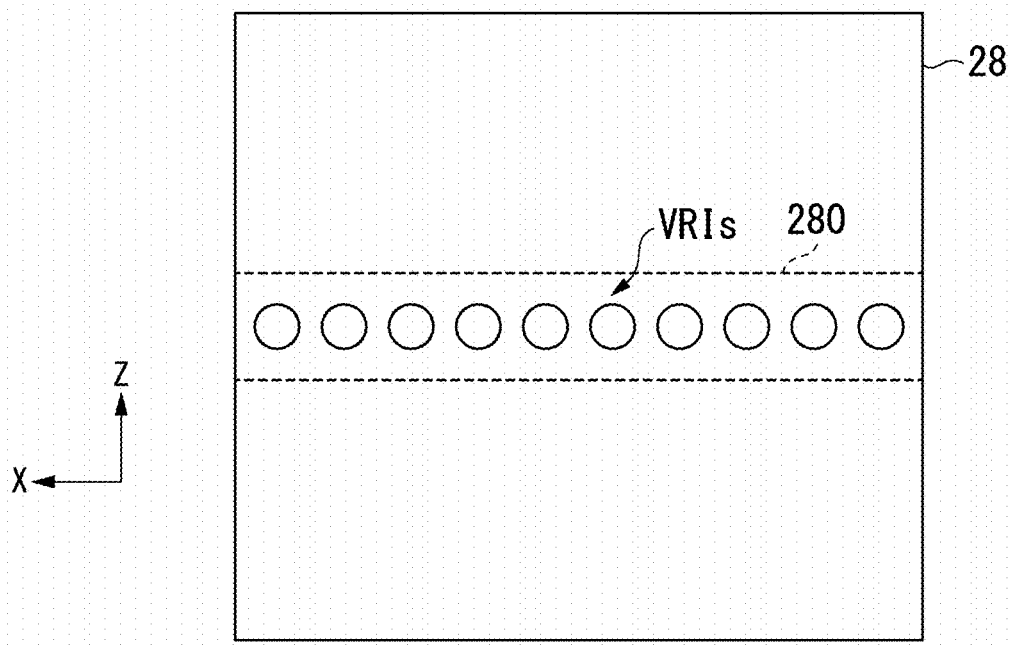
FIG. 10 is a diagram illustrating an example of a pixel array in an area on which an image is focused in the image sensor according to the first embodiment of the present invention.

An example of a pixel array in an area on which an image is formed in the image sensor 28 is illustrated in FIG. 10. Each of a plurality of images VRI is an image of each of a plurality of cells CLs. As described above, a plurality of cells CLs are arranged in the height direction of the flow channel 21 by acoustic waves AW as standing waves being applied to the flow channel 21. Accordingly, the image sensor 28 images the plurality of cells CLs in a state in which the plurality of cells CLs are arranged in a line in the width direction. In the imaging flow cytometer 20, the number of observation objects per frame can be set to be larger than that in a case in which the observation objects are not arranged in a line in the height direction.

In this embodiment, the image sensor 28 is an image sensor which is constituted by a scientific CMOS (sCMOS) or the like. The sCMOS can capture an image faster and with higher image quality than an image sensor which is constituted by a CCD or a CMOS in the related art.

The image sensor 28 supplies the captured image to an image-acquiring unit 24.

The control unit 200 includes, for example, a CPU, a graphics processing unit (GPU), or a field-programmable gate array (FPGA) and performs various arithmetic operations and transmission and reception of information. The control unit 200 includes an image-acquiring unit 24 as a functional unit thereof.

The image-acquiring unit 24 acquires a captured image from the image sensor 28. The image-acquiring unit 24 stores the captured image acquired from the image sensor 28 as a cross-sectional image PIC in a storage unit 25. In the storage unit 25, the cross-sectional images PIC are stored in the imaging order.

The three-dimensional image-generating unit 26 generates a three-dimensional image of a cell CL on the basis of a plurality of cross-sectional images PIC acquired by the imaging unit imaging a cross section CS of the cell CL in a time series. The three-dimensional image of the cell CL is an image obtained by scanning the cell CL in a flow line direction which is a direction in which the cell CL flows in the flow channel 21. The three-dimensional image-generating unit 26 acquires the plurality of cross-sectional images PIC from the storage unit 25. The three-dimensional image-generating unit 26 generates the three-dimensional image of the cell CL on the basis of the plurality of cross-sectional images PIC acquired from the storage unit 25. Specifically, the three-dimensional image-generating unit 26 synthesizes the cross-sectional images PIC in the −y-axis direction in the imaging order thereof. The cross-sectional images PIC are images obtained by imaging the aforementioned plane LP.

The order in which the three-dimensional image-generating unit 26 synthesizes the cross-sectional images PIC will be described below in detail with reference to FIG. 11.

Figure 11:
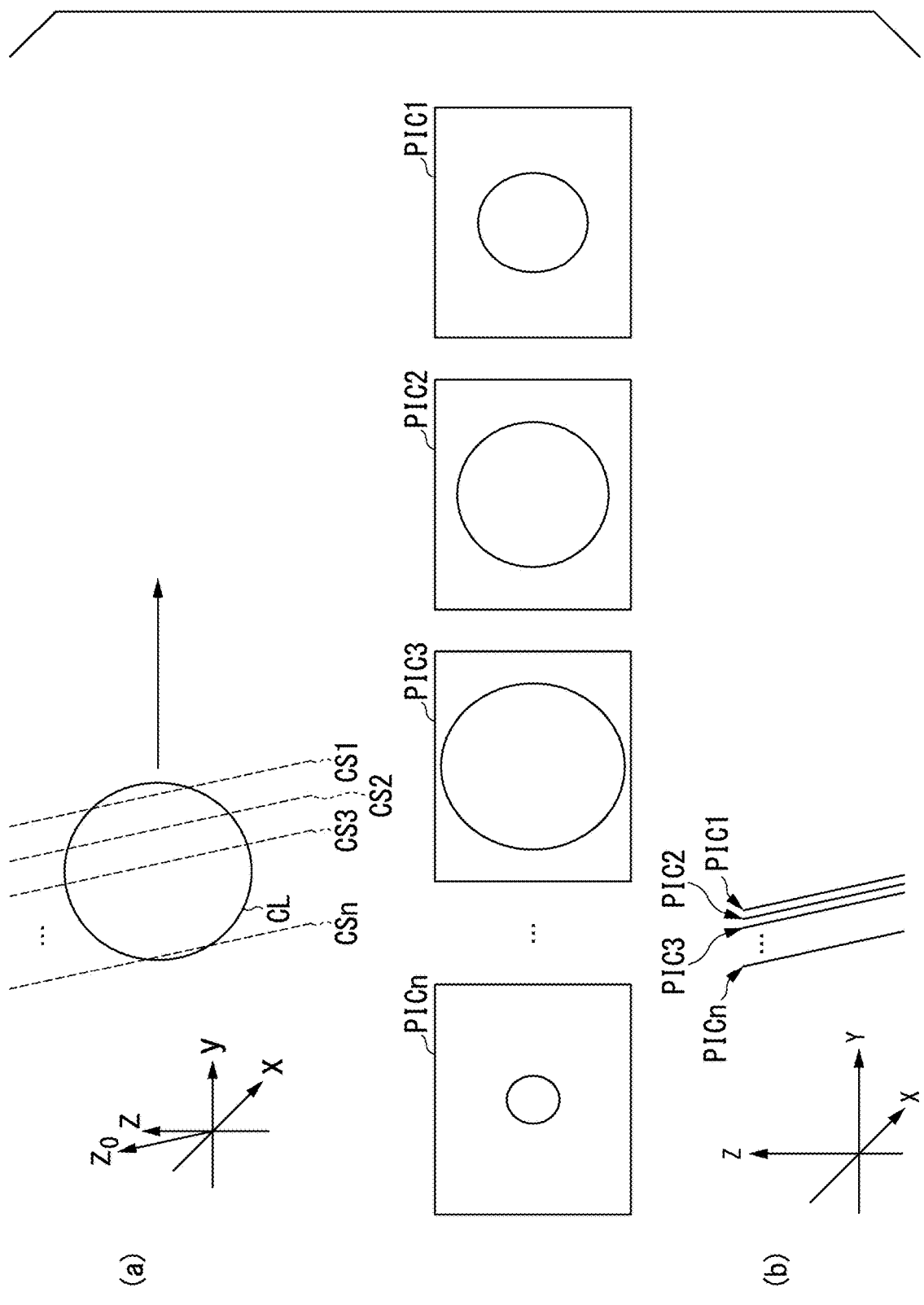
FIG. 11 is a diagram illustrating an example of the order in which a three-dimensional image-generating unit synthesizes cross-sectional images according to the first embodiment of the present invention.

FIG. 11 is a diagram illustrating the order in which the three-dimensional image-generating unit 26 synthesizes the cross-sectional images PIC.

(a) of FIG. 1I is a diagram illustrating an example of correspondence between a cross section of a cell CL and a cross-sectional image.

A cell CL moves in the +y-axis direction. The imaging unit 23 sequentially captures n cross-sectional images PIC from cross sections CS1 to CSn of the cell CL in a time series. Here, n of a cross section CSn is an integer equal to or greater than 1.

Cross-sectional images including a cross-sectional image PIC1 of the cross section CS1 to a cross-sectional image PICn of the cross section CSn are stored in the storage unit 25.

(b) of FIG. 11 is a diagram illustrating the order in which the three-dimensional image-generating unit 26 synthesizes the cross-sectional images PIC1 to PICn. The three-dimensional image-generating unit 26 synthesizes the cross-sectional images PIC in the −y-axis direction in the imaging order thereof. This is because the cell CL moves in the +y-axis direction. The synthesizing order changes depending on the moving direction of the cell CL.

In (b) of FIG. 11, an XYZ coordinate system is illustrated as a three-dimensional orthogonal coordinate system. The XYZ coordinate system is a coordinate system of a three-dimensional image generated by the three-dimensional image-generating unit 26. The three-dimensional image-generating unit 26 synthesizes the cross-sectional images PIC1 to PICn in a state in which the XYZ coordinate system is associated with the xyz coordinate system. Specifically, the three-dimensional image-generating unit 26 sets the X-axis direction and the x-axis direction to the same direction. The three-dimensional image-generating unit 26 sets the Y-axis direction and the y-axis direction to the same direction. The three-dimensional image-generating unit 26 sets the Z-axis direction and the z-axis direction to the same direction. The three-dimensional image-generating unit 26 generates the three-dimensional image of the cell CL by sequentially synthesizing the cross-sectional images PIC1 to PICn in the −Y-axis direction.

Schematic Operation of Imaging Flow Cytometer 20

A schematic operation of the imaging flow cytometer 20 will be described below with reference to FIG. 12.

Figure 12:
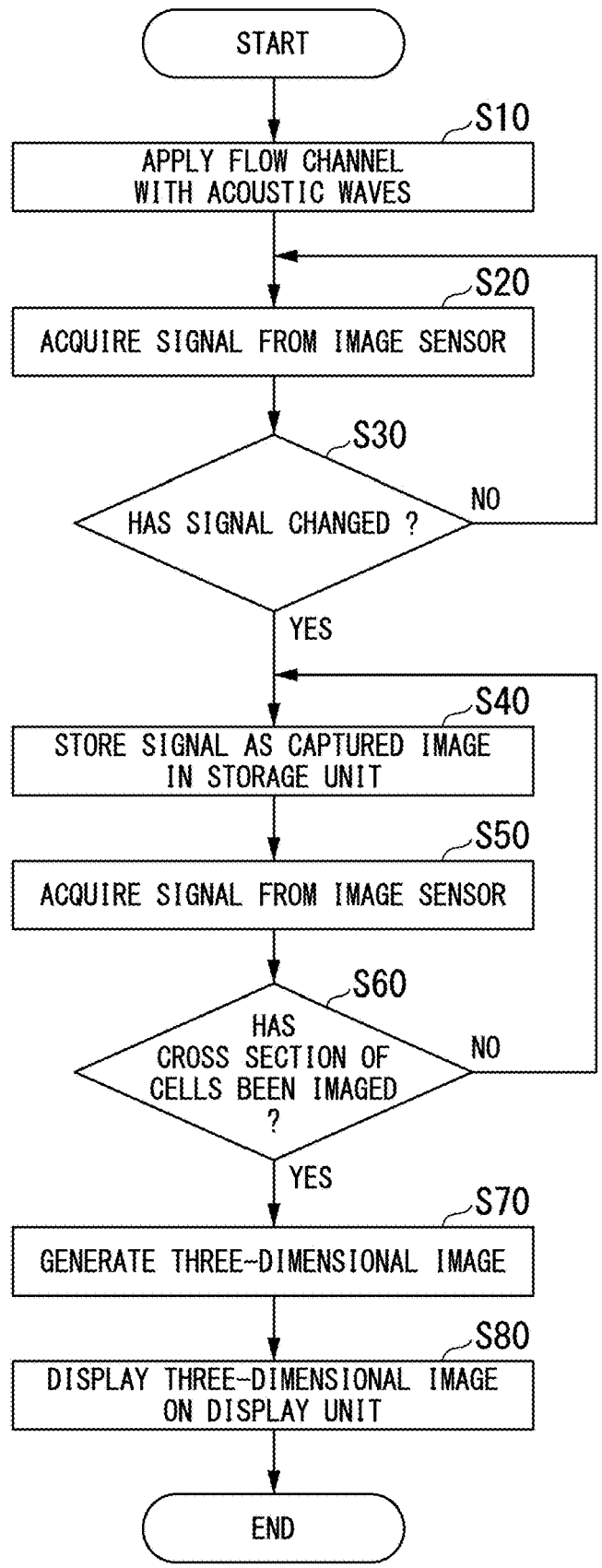
FIG. 12 is a flowchart illustrating an example of an operation which is performed by an imaging flow cytometer according to the first embodiment of the present invention.

FIG. 12 is a flowchart illustrating an example of an operation which is performed by the imaging flow cytometer 20. The operation described herein is an example, and a part of the operation may be omitted or apart of the operation may be added.

(Step S10) The acoustic element 22 applies acoustic waves AW to the flow channel 21.

(Step S20) The image sensor 28 constantly captures an image at a focal position FP. The image-acquiring unit 24 acquires a signal from the image sensor 28. The signal is a signal indicating the cross-sectional image PIC.

(Step S30) The image-acquiring unit 24 determines whether the signal acquired from the image sensor 28 has changed. Specifically, a pre-detection signal which is a signal in a state in which no cell CL flows in the flow channel is stored in the image-acquiring unit 24. The image-acquiring unit 24 compares the pre-detection signal with the signal acquired from the image sensor 28. Specifically, when there is no predetermined difference between the pre-detection signal and the signal acquired from the image sensor 28, the image-acquiring unit 24 determines that the signal has not changed. When there is a predetermined difference between the pre-detection signal and the signal acquired from the image sensor 28, the image-acquiring unit 24 determines that the signal has changed.

(Step S30: NO) When it is determined that the signal has not changed, the image-acquiring unit 24 repeats the operation from Step S10.

(Step S30: YES) When it is determined that the signal has changed, the image-acquiring unit 24 stores the signal acquired from the image sensor 28 as a cross-sectional image PIC in the storage unit 25 (Step S40).

(Step S50) The image-acquiring unit 24 acquires a signal from the image sensor 28.

(Step S60) The image-acquiring unit 24 determines whether imaging of a cross section of the cell CL has finished on the basis of the signal acquired from the image sensor 28. Specifically, when there is a predetermined difference between the pre-detection signal and the signal acquired from the image sensor 28, the image-acquiring unit 24 determines that imaging of a cross section of the cell has not finished. When there is no predetermined difference between the pre-detection signal and the signal acquired from the image sensor 28, the image-acquiring unit 24 determines that imaging of a cross section of the cell has finished.

(Step S60: NO) When it is determined that imaging of a cross section of the cell has not finished, the image-acquiring unit 24 repeats the operation from Step S40.

(Step S60: YES) When it is determined that imaging of a cross section of the cell has finished, the image-acquiring unit 24 performs the process of Step S70.

(Step S70) The three-dimensional image-generating unit 26 acquires a plurality of cross-sectional images PIC from the storage unit 25. The three-dimensional image-generating unit 26 generates a three-dimensional image by synthesizing the plurality of cross-sectional images PIC acquired from the storage unit 25.

(Step S80) The three-dimensional image-generating unit 26 displays the generated three-dimensional image on the display unit 10. Then, the imaging flow cytometer 20 ends the operation.

A sound effect in the imaging flow cytometer 20 according to this embodiment will be described below with reference to FIGS. 13 and 14.

Figure 13:
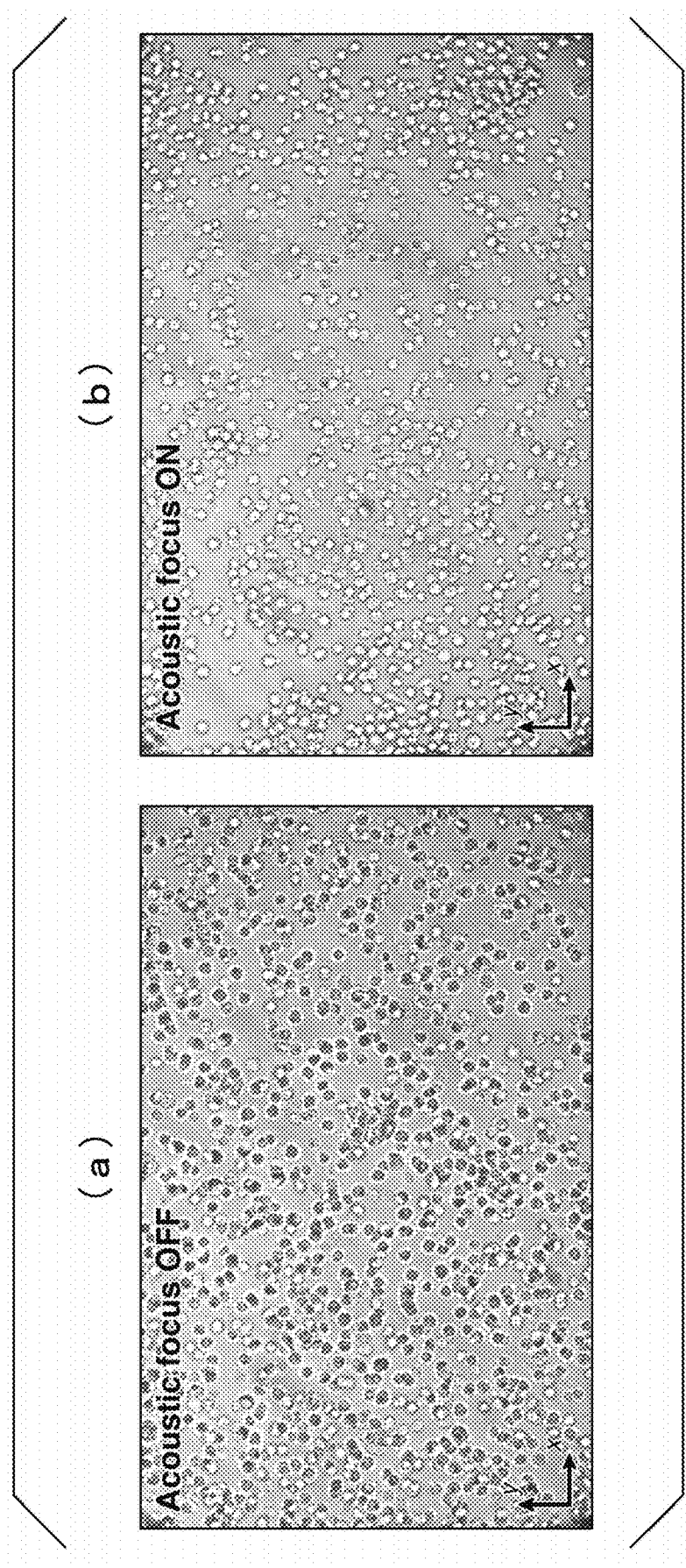
FIG. 13 is a diagram illustrating an example of a bright-field image obtained by imaging a plurality of cells in the height direction of the flow channel according to the first embodiment of the present invention.

FIG. 13 is a diagram illustrating an example of a bright-field image obtained by imaging a plurality of cells in the height direction (the z-axis direction) of the flow channel 21 according to this embodiment. (a) of FIG. 13 illustrates a bright-field image when acoustic waves AW have not been applied, and (b) of FIG. 13 illustrates a bright-field image when acoustic waves AW have been applied. In the bright-field images, a plurality of cells appear with contrast (brightness) corresponding to positions in the height direction (the z-axis direction). In the imaging results illustrated in FIG. 13, a glass capillary with a height of 200 μm and a width of 2 mm is used as the flow channel 21. In the flow channel 21, a suspension including a plurality of cells having undergone fluorescence staining by 1×107 per mm flows at a flow rate of 10 μl per minute.

When acoustic waves AW are not applied as illustrated in (a) of FIG. 13, variation in contrast has occurred in the plurality of cells and variation in position and speed in the height direction (the z-axis direction) of the flow channel 21 has occurred. When acoustic waves AW are not applied, it is ascertained that the plurality of cells rotate in the process of imaging. On the other hand, when acoustic waves AW are applied as illustrated in (b) of FIG. 13, variation in contrast has not occurred in the plurality of cells, variation in position and speed in the height direction (the z-axis direction) of the flow channel 21 has not occurred, and rotation has not occurred.

Figure 14:
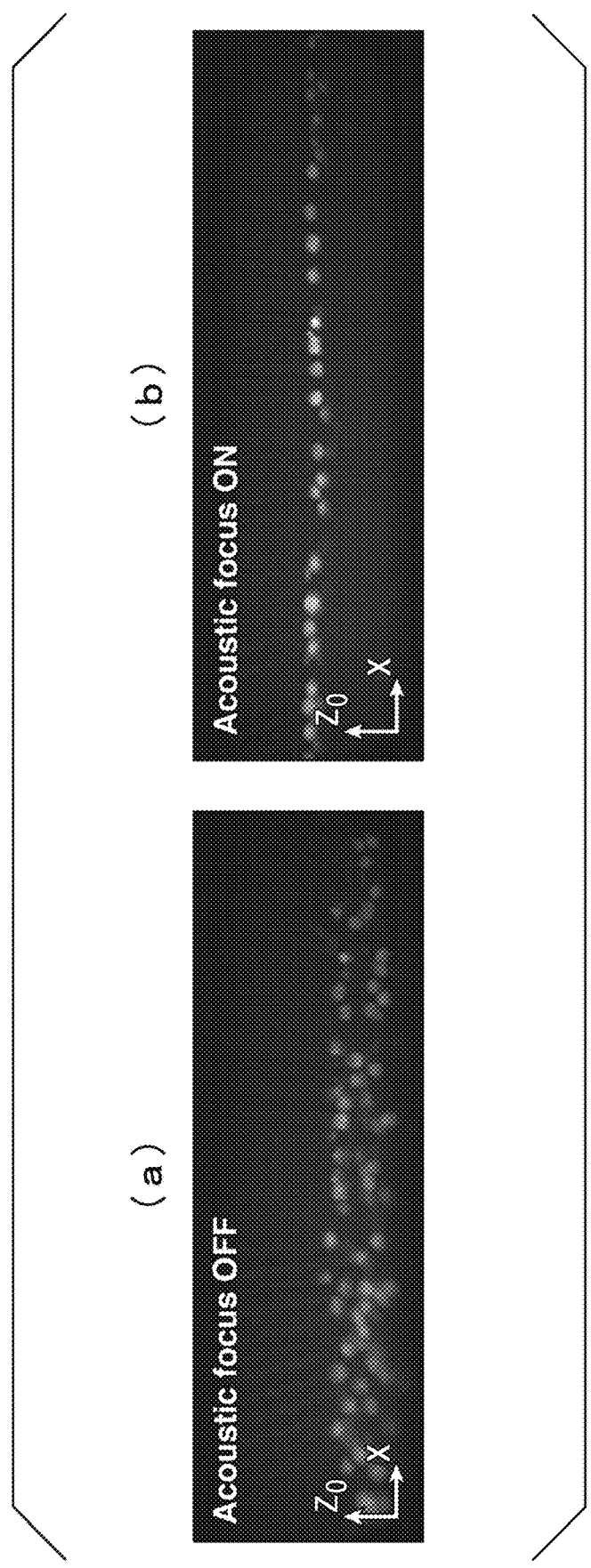
FIG. 14 is a diagram illustrating an example of a fluorescent image obtained by imaging a plurality of cells in a plane inclined by a predetermined angle with respect to the height direction according to the first embodiment of the present invention.

FIG. 14 is a diagram illustrating an example of a fluorescence image obtained by imaging a plurality of cells in a plane inclined by a predetermined angle with respect to the height direction according to this embodiment. The plane inclined by a predetermined angle with respect to the height direction is the plane LP described above with reference to FIG. 9. (a) of FIG. 14 illustrates a fluorescent image when acoustic waves AW have not been applied, and (b) of FIG. 14 illustrates a fluorescent image when acoustic waves AW have been applied. In the imaging results illustrated in FIG. 14, imaging at 20 frames per second has been performed using 800×2560 pixels corresponding to an area on which an image is formed out of the pixels of the image sensor 28.

When acoustic waves AW are not applied as illustrated in (a) of FIG. 14, the plurality of cells flow in an area closer to the bottom than the center in the height direction of the flow channel 21 due to gravity. On the other hand, acoustic waves AW are applied as illustrated in (b) of FIG. 14, the plurality of cells flow at the center in the height direction of the flow channel 21.

A result (imaging) of capturing a three-dimensional image of cells in the imaging flow cytometer 20 will be described below with reference to FIGS. 15 to 18.

Figure 15:
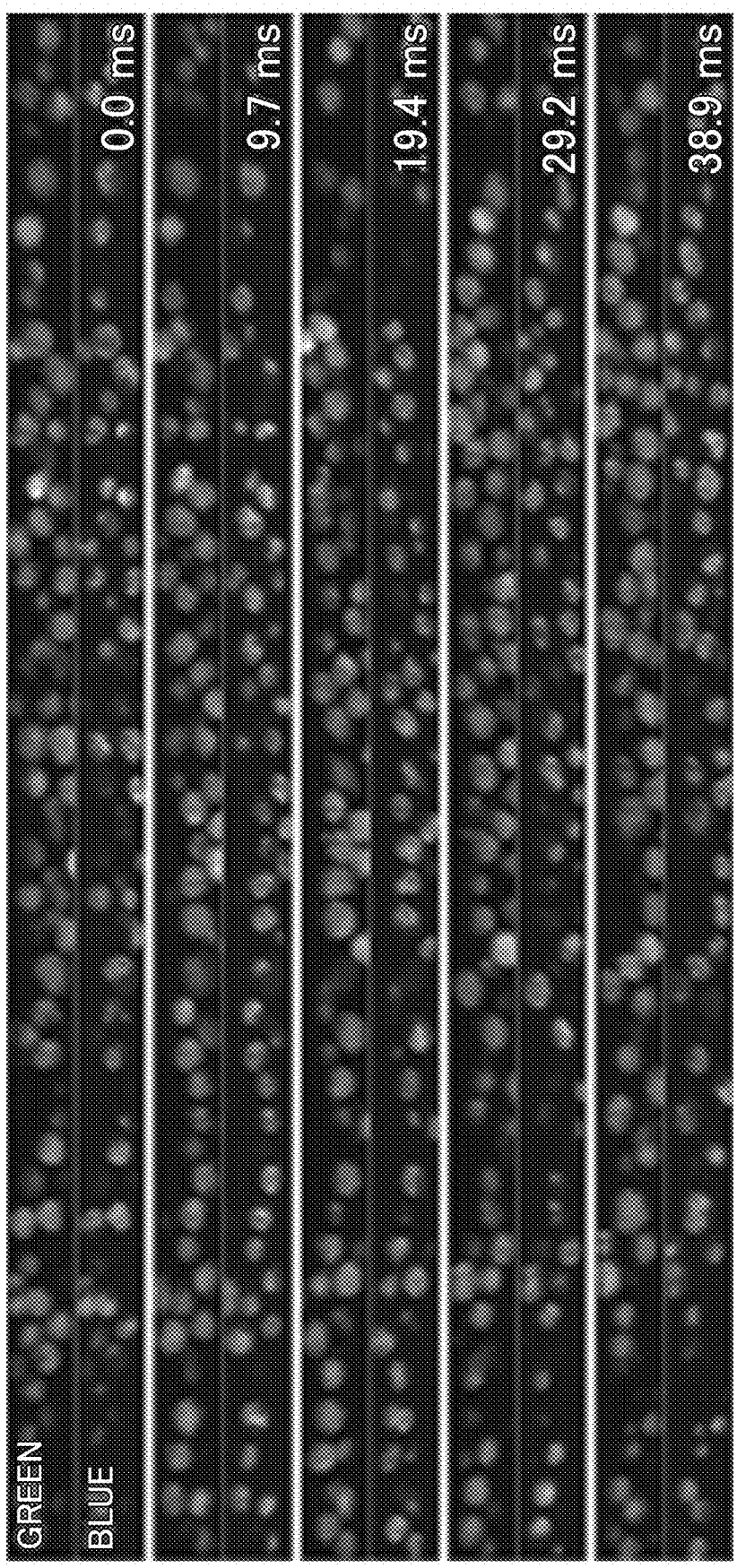
FIG. 15 is a diagram illustrating an example of a cross-sectional image obtained by imaging a plane inclined by a predetermined angle with respect to the height direction at different times according to the first embodiment of the present invention.

FIG. 15 is a diagram illustrating an example of cross-sectional images obtained by imaging a plane (plane LP) inclined by a predetermined angle with respect to the height direction at different times according to this embodiment. The cross-sectional images illustrated in FIG. 15 are obtained by performing imaging at 720 frames per second. In this imaging, the height of the flow channel 21 is 200 μm, and only pixels used for imaging an area corresponding to a height of 36 μm in the length direction out of the pixels of the image sensor 28 are used.

Figure 16:
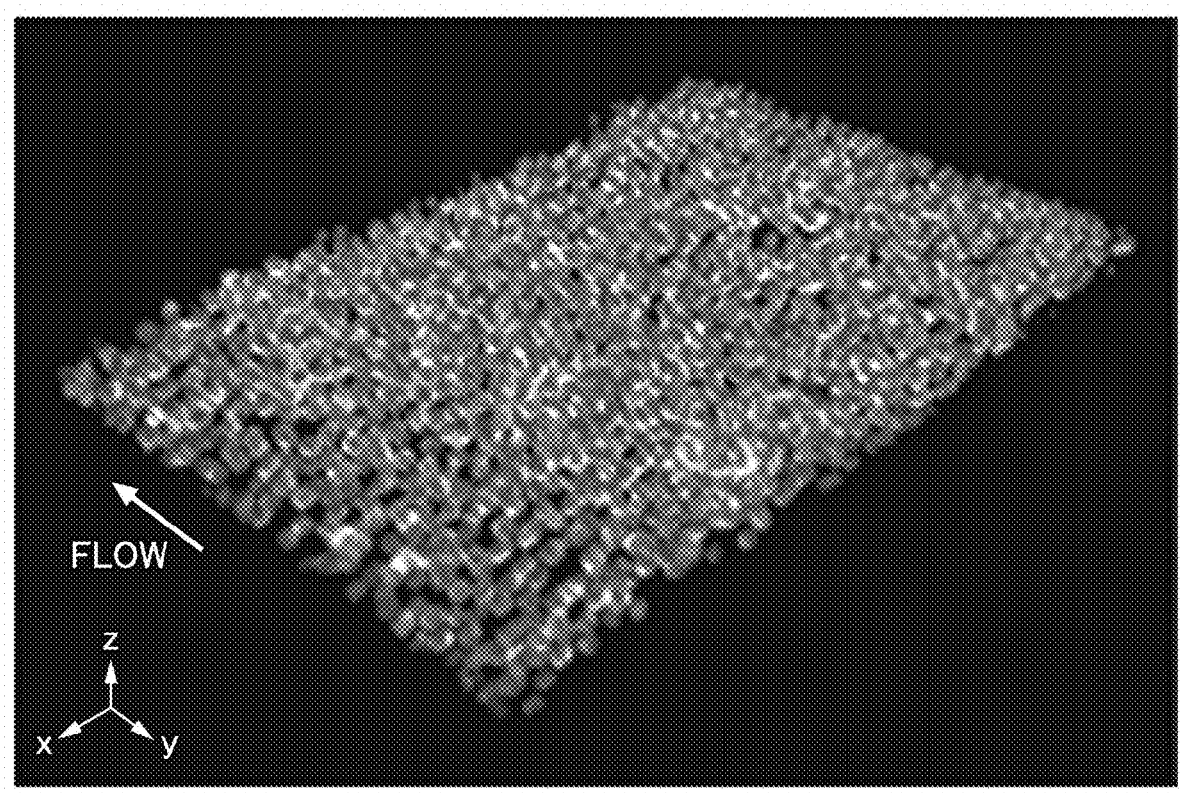
FIG. 16 is a diagram illustrating an example of a three-dimensional image according to the first embodiment of the present invention.

FIG. 16 is a diagram illustrating an example of a three-dimensional image which has been reconstructed from the cross-sectional images illustrated in FIG. 15. FIG. 16 illustrates a three-dimensional image reconstructed from images of 600 frames in association with images of cross-sectionals captured at 720 frames per second. In the three-dimensional image illustrated in FIG. 16, 1921 cells are imaged over 833 ms. As throughput this corresponds to imaging of 2305 cells per second.

Figure 17:
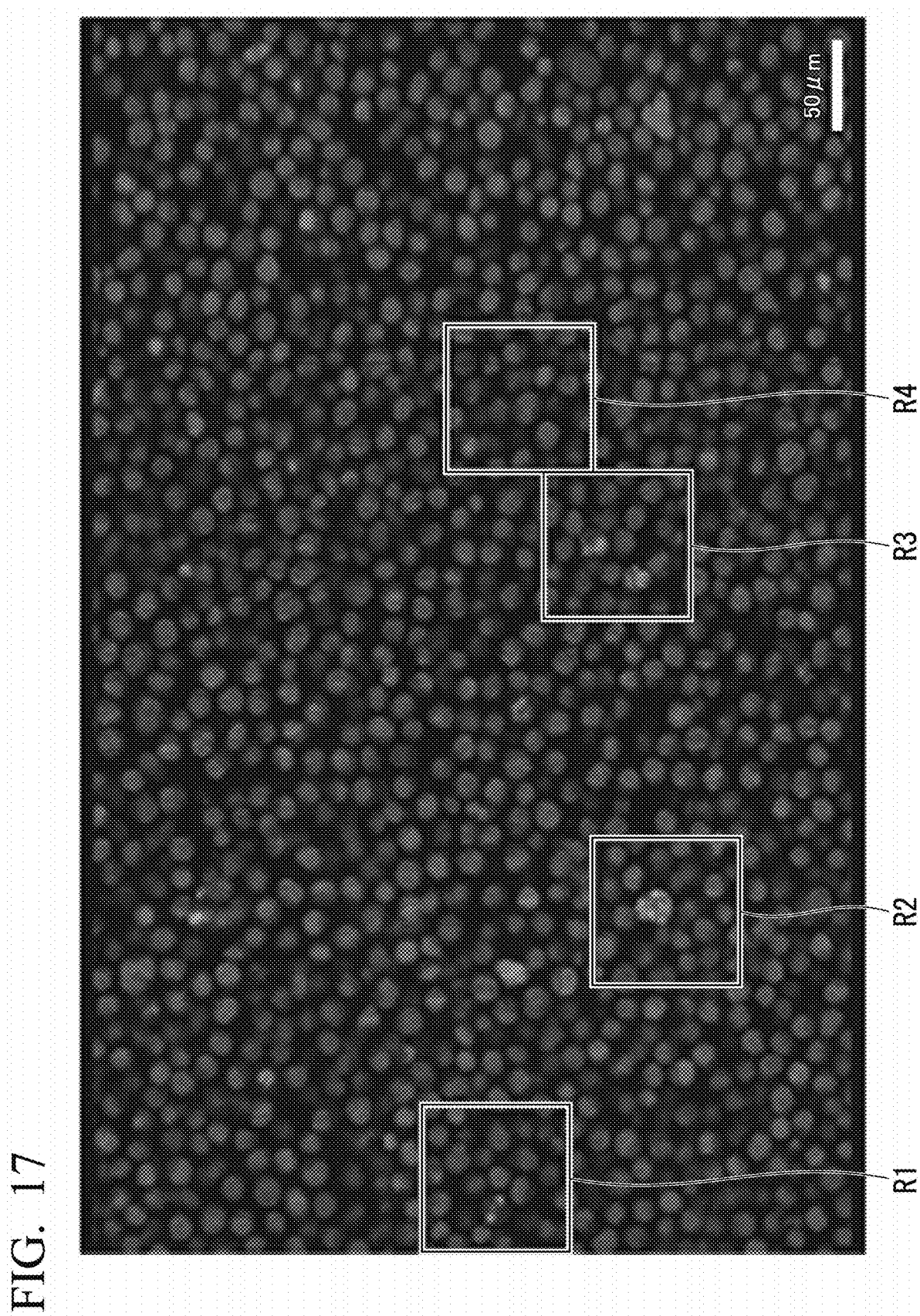
FIG. 17 is a diagram illustrating an example of an image of a cross section in an x direction and a y direction according to the first embodiment of the present invention.
Figure 18:
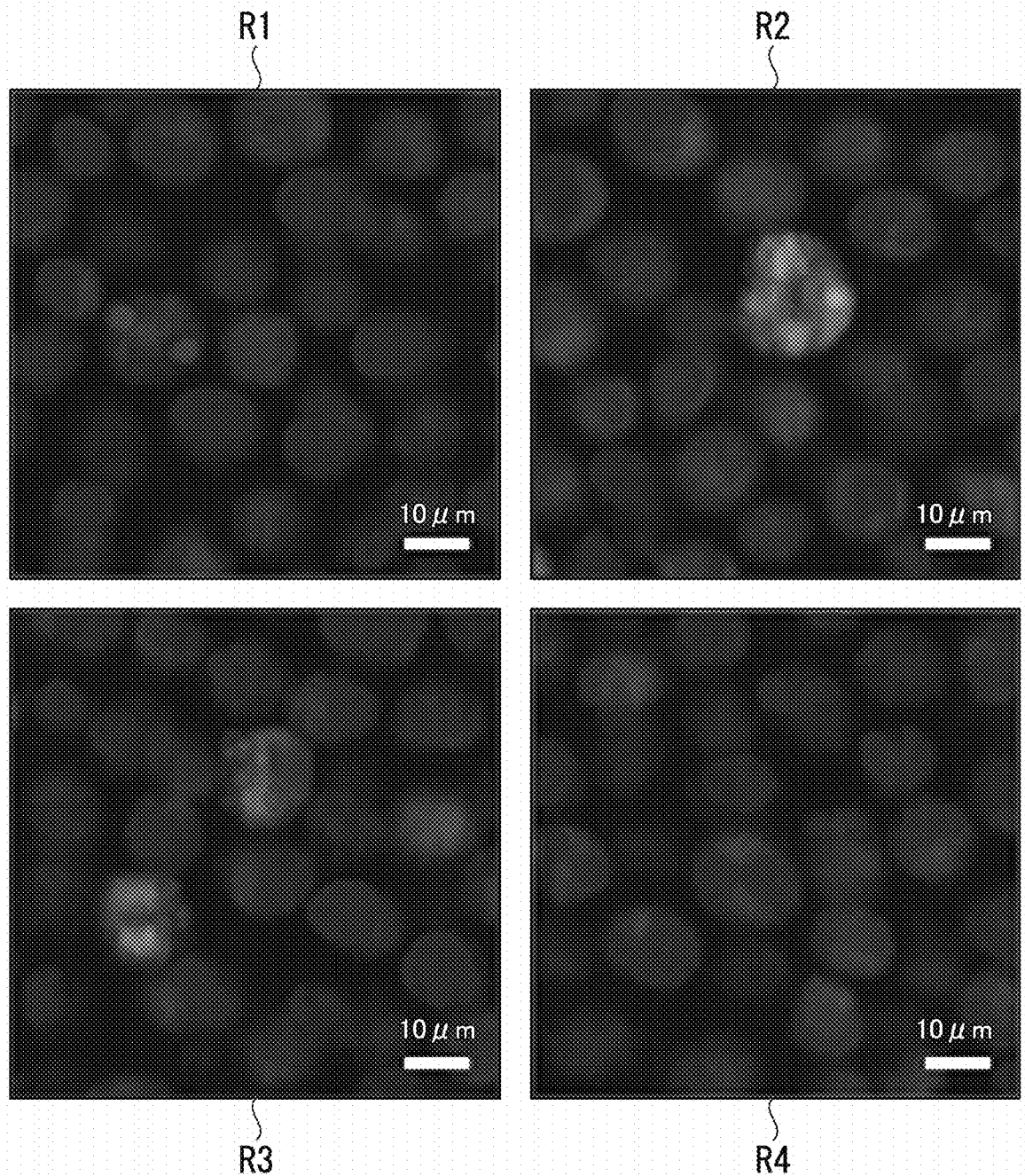
FIG. 18 is a diagram illustrating an example of enlarged views of areas in a cross-sectional image according to the first embodiment of the present invention.

FIG. 17 is a diagram illustrating cross-sectional image in the x-axis direction and the y-axis direction. FIG. 18 illustrates enlarged views of areas (an area R1, an area R2, an area R3, and an area R4) of the cross-sectional image illustrated in FIG. 17 according to this embodiment.

Second Embodiment

An imaging flow cytometer according to a second embodiment will be described below with reference to FIG. 19. The same elements and operations as in the first embodiment will be referred to by the same reference signs and description thereof will be omitted.

Figure 19:
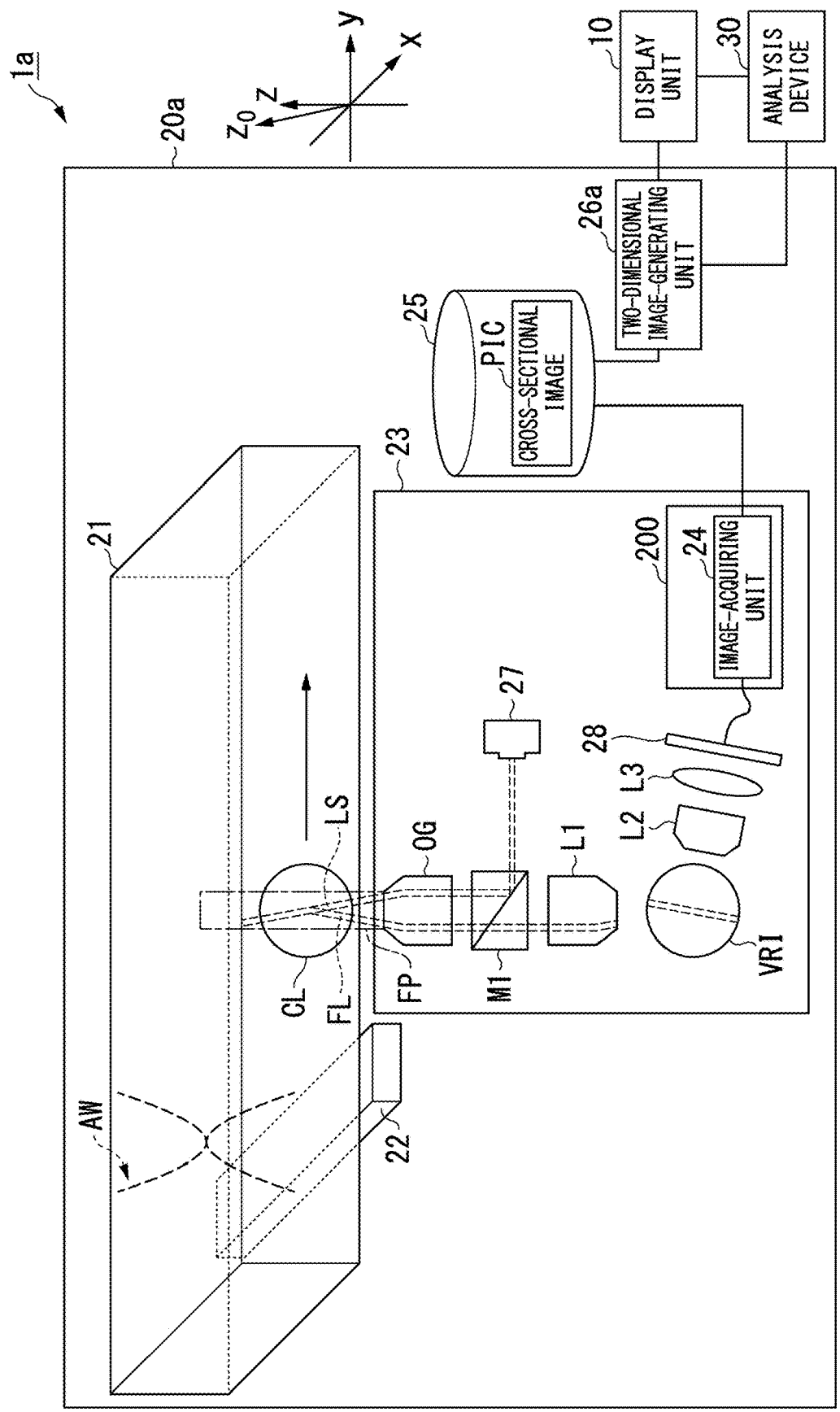
FIG. 19 is a diagram illustrating an example of a functional configuration of a cytometry system according to a second embodiment of the present invention.

FIG. 19 is a diagram illustrating an example of a functional configuration of a cytometry system 1a according to the second embodiment. The cytometry system 1a is different from the cytometry system 1 according to the first embodiment in that a two-dimensional image is generated.

An imaging flow cytometer 20a includes a flow channel 21, an acoustic element 22, an imaging unit 23a, a storage unit 25, and a two-dimensional image-generating unit 26a.

The imaging unit 23a includes a light source 27b, an objective lens OG, an image sensor 28, a first optical element L1, a second optical element L2, a third optical element L3, and a control unit 200.

The imaging unit 23a is a line scan camera. The line scan camera acquires detected light intensities for a pixel array of one line arranged in the longitudinal direction or the lateral direction of the image sensor 28. The imaging unit 23a images a line included in a cross section of an observation object in a time series. This line is one line included in a group of lines when the cross section is considered as the group of lines in a certain direction. For example, a photo-detector such as a linear-array photomultiplier tube (PMT) or some pixels of a sCMOS camera are used as the image sensor 28.

The two-dimensional image-generating unit 26a generates a two-dimensional image in which an observation object is scanned in a flow line direction on the basis of a plurality of images of a line captured in a time series by the imaging unit 23a.

The order in which the two-dimensional image-generating unit 26a synthesizes line images PLC will be described below in detail with reference to FIG. 20.

Figure 20:
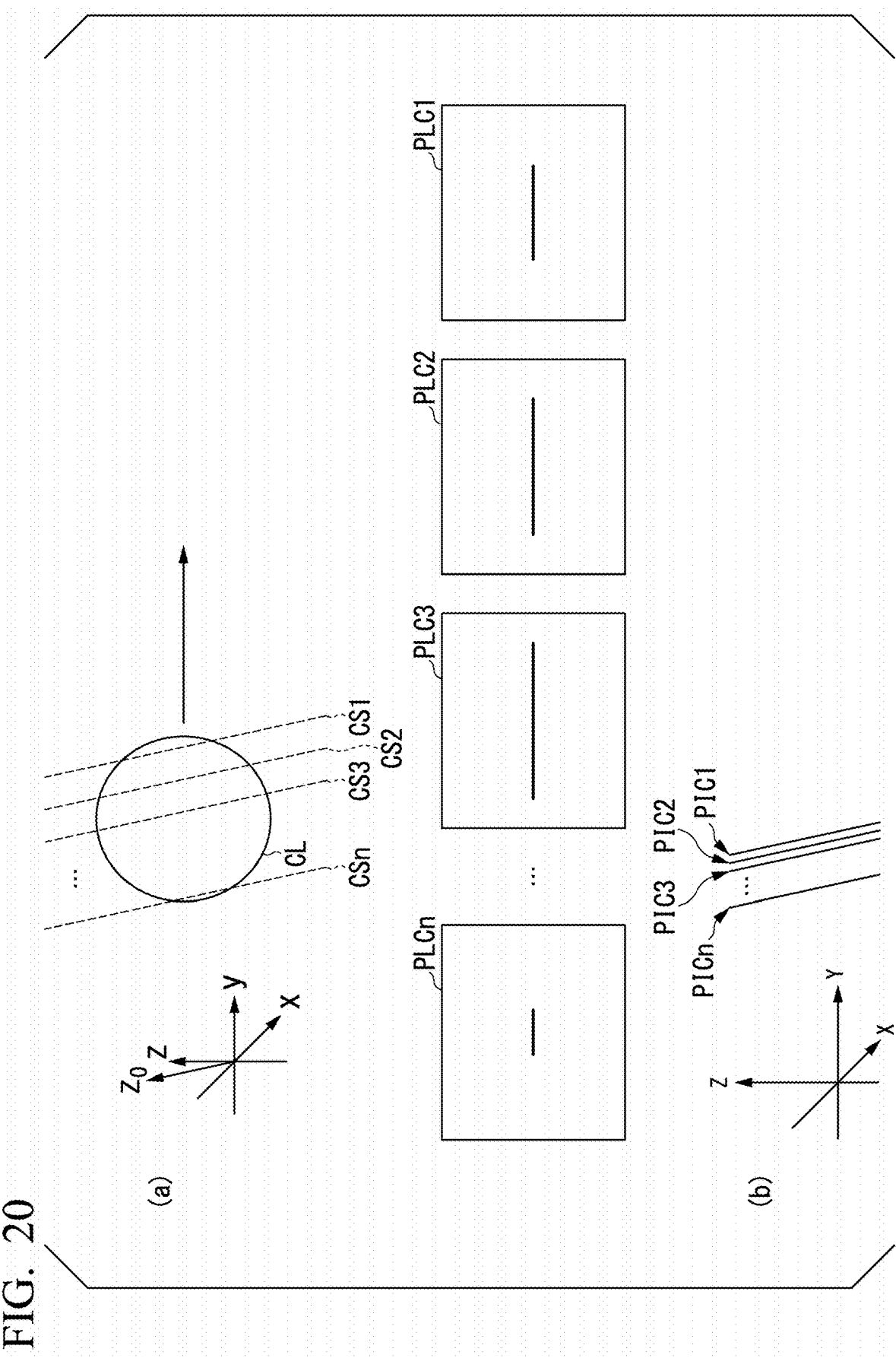
FIG. 20 is a diagram illustrating an example of the order in which a two-dimensional image-generating unit synthesizes line images according to the second embodiment of the present invention.

FIG. 20 is a diagram illustrating the order in which the two-dimensional image-generating unit 26a synthesizes the line images PLC.

(a) of FIG. 20 is a diagram illustrating an example of correspondence between a line included in a cross section of a cell CL and a line image.

A cell CL moves in the +y-axis direction. The imaging unit 23 sequentially captures n line images PLC from lines included in each of cross sections CS1 to CSn of the cell CL in a time series. Here, n of a cross section CSn is an integer equal to or greater than 1.

A line image PLC1 of a line included in a cross section CS1 to a line image PLCn of a line included in the cross section CSn are stored in the storage unit 25.

(b) of FIG. 20 is a diagram illustrating the order in which the two-dimensional image-generating unit 26a synthesizes the line images PLC1 to PLCn. The two-dimensional image-generating unit 26a synthesizes the line images PLC in the −y-axis direction in the imaging order thereof.

In (b) of FIG. 20, an XYZ coordinate system is illustrated as a three-dimensional orthogonal coordinate system. An XY coordinate system which is a two-dimensional coordinate system including an X axis and a Y axis included in the XYZ coordinate system is a coordinate system of a two-dimensional image generated by the two-dimensional image-generating unit 26a. The two-dimensional image-generating unit 26a synthesizes the line images PLC1 to PLCn in a state in which the XYZ coordinate system is associated with the x axis and the y axis of the xyz coordinate system. Specifically, the two-dimensional image-generating unit 26a sets the X-axis direction and the x-axis direction to the same direction. The two-dimensional image-generating unit 26a sets the Y-axis direction and the y-axis direction to the same direction. The two-dimensional image-generating unit 26a generates the two-dimensional image of the cell CL by sequentially synthesizing the line images PLC1 to PLCn in the −Y-axis direction.

Summary of Embodiments

As described above, the imaging flow cytometers 20 and 20a according to the aforementioned embodiments include the flow channel 21, the acoustic element 22, the light source 27, the imaging units 23, 23a, and 23b, and the scan image-generating unit (the three-dimensional image-generating unit 26 and the two-dimensional image-generating unit 26a).

The flow channel 21 is a flow channel in which an observation object (a cell CL in the aforementioned embodiments) flows, and a length in a width direction (the width-direction length FW in the aforementioned embodiments) is longer than a length in a height direction (the height-direction length FH in the aforementioned embodiments).

The acoustic element 22 applies acoustic waves AW as standing waves to the flow channel 21.

The light sources 27 and 27b irradiate the flow channel 21 with illumination light LS and illumination light LSb.

The imaging units 23, 23a, and 23b image at least a line included in a cross section CS of the observation object (a cell CL in the aforementioned embodiments) in a flow line direction in which the observation object (a cell CL in the aforementioned embodiments) flows in the flow channel 21 by measuring or imaging the observation object (a cell CL in the aforementioned embodiments) passing through a position which is irradiated with the illumination light LS and the illumination light LSb.

The scan image-generating unit (the three-dimensional image-generating unit 26 and the two-dimensional image-generating unit 26a) generates an image (a three-dimensional image of the cell CL and a two-dimensional image of the cell CL in the aforementioned embodiments) in which the observation object (a cell CL in the aforementioned embodiments) is scanned in the flow line direction on the basis of a plurality of captured images (the cross-sectional images PIC and the line images PLC in the aforementioned embodiments) acquired by the imaging units 23, 23a, and 23b imaging lines included in the cross sections CS in a time series. The flow line direction is a direction in which the observation object (a cell CL in the aforementioned embodiments) flows in the flow channel 21.

With this configuration, since the imaging flow cytometers 20 and 20a according to the aforementioned embodiments can curb variation in velocity (a direction and a speed) of the observation object and rotation of the observation object in the process of imaging the observation object using the sound effect, it is possible to stabilize the imaging conditions. The imaging conditions include a position, rotation, and a velocity of the observation object in a direction perpendicular to the flow line direction in the process of imaging. Since the imaging flow cytometers 20 and 20a according to the embodiments generate a scanned image by scanning the observation object in the flow line direction, the observation object cannot be scanned in the flow direction when the position, the rotation (the direction of the observation object), or the velocity of the observation object in a direction perpendicular to the flow line direction varies in the process of imaging the observation object.

In the imaging flow cytometers 20 and 20a according to the embodiments, since passing of the observation object through a position other than the imaging position in the height direction of the flow channel 21 can be curbed due to the sound effect, it is possible to perform capturing of an image using only a pixel array corresponding to a specific position in the height direction of the flow channel 21 out of the pixel arrays of the image sensor 28 provided in the imaging unit 23. When capturing of an image is performed using only a pixel array corresponding to a specific position in the height direction of the flow channel 21 out of the pixel arrays of the image sensor 28 provided in the imaging unit 23, an image of the observation object is not obtained when the observation object passes through a position other than the imaging position in the height direction of the flow channel 21.

As described above, the imaging unit 23 is a camera and has an imaging speed limit, that is, a limit of the number of frames which can be captured per unit time. Accordingly, in the imaging flow cytometers 20 and 20a, if a flow rate of a fluid flowing in the flow channel 21 is not kept low, the number imaging times for an imaging object in the flow direction decreases and a resolution decreases. That is, in the imaging flow cytometers 20 and 20a, a desired flow rate is determined according to the imaging unit 23.

In the related art, hydrodynamic focusing is known to stabilize a position of the observation object in the height direction of the flow channel 21. When a plurality of flow channels are provided and hydrodynamic focusing is performed, the flow rate of the fluid flowing in the flow channel 21 is higher than that before hydrodynamic focusing is performed, and the flow rate is not stabilized. Since the flow rate corresponding to the imaging unit is much higher than the desired flow rate, the resolution of the captured image in the flow direction decreases. In the imaging flow cytometers 20 and 20a, unlike hydrodynamic focusing with which the flow rate increases, it is possible to perform imaging without changing the flow rate from the desired flow rate due to the sound effect.

In the imaging flow cytometers 20 and 20a, it is possible to stabilize the imaging conditions described above and to perform imaging for stably and quickly generating a scanned image when the observation object flowing in the flow channel is scanned in the flow line direction.

In the imaging flow cytometers 20 and 20a according to the aforementioned embodiments, the number of nodes of the standing waves of acoustic waves AW in the height direction of the flow channel 21 is one, and the number of nodes of the standing waves of acoustic waves AW in the width direction of the flow channel 21 is zero.

With this configuration, in the imaging flow cytometers 20 and 20a according to the embodiments, since the number of nodes of the standing waves of acoustic waves AW in the width direction of the flow channel 21 is zero, the number of cells CLs arranged in the width direction of the flow channel 21 is not limited by the number of nodes.

The number of nodes of the standing waves of acoustic waves AW in the height direction may be one, and the number of nodes of the standing waves of acoustic waves AW in the width direction of the flow channel 21 may be equal to or greater than one.

The number of nodes of the standing waves of acoustic waves AW in the height direction of the flow channel 21 may be equal to or greater than two.

In the imaging flow cytometers 20 and 20a according to the embodiments, a plurality of observation objects (a plurality of cells CLs in the embodiments) arranged in the width direction of the flow channel 21 flow in the flow channel 21.

With this configuration, since the imaging flow cytometers 20 and 20a according to the embodiments can increase the number of observation objects per frame in comparison with a case in which one observation object flows in the flow channel 21, it is possible to generate a scanned image of a larger number of observation objects in comparison with a case in which one observation object flows in the flow channel 21 per unit time. In the imaging flow cytometers 20 and 20a according to the embodiments, it is possible to improve both a throughput (the number of cells which can be measured per unit time) and a signal-to-noise ratio. Improvement of both the throughput and the signal-to-noise ratio means that a measurement time for each cell is increased to increase the signal-to-noise ratio by simultaneously measuring more cells at each moment when measuring is performed with the same throughput.

In the imaging flow cytometers 20 and 20a according to the embodiments, since a plurality of observation objects are arranged in a line in the width direction of the flow channel 21, an image sensor that acquires light intensity of only a pixel array in an area in which an image is formed can be preferably employed as the image sensor 28 which is provided in the imaging unit 23. In such an image sensor, since light intensity of a pixel array in an area in which an image is not formed other than the positions at which the plurality of observation objects are arranged in the height direction of the flow channel 21 is not acquired, it is possible to decrease a period time for image processing in which a captured image is generated.

In the imaging flow cytometers 20 and 20a according to the embodiments, an example in which belt-shaped illumination light LS is used has been described, but the present invention is not limited thereto. Another imaging technique of imaging three-dimensional information or two-dimensional information by imaging a cross section of an observation object flowing in a flow channel may be used. Illumination light may not have a belt shape, and the illumination light may not be inclined with respect to the height direction of the flow channel.

The imaging flow cytometers 20 and 20a according to the embodiments may sort observation objects on the basis of a three-dimensional image or a two-dimensional image in which the observation objects imaged by the imaging flow cytometers 20 and 20a are scanned in the flow line direction. Sorting is to separately sample predetermined observation objects out of the observation objects flowing in the flow channel 21. The predetermined observation objects can be selected in advance by a user.

The sorting is mentioned herein. For example, predetermined cells and objects such as waste or other cells other than the predetermined cells may flow in the flow channel 21 as the observation objects. The sorting is to select and extract predetermined cells out of the observation objects.

That is, by comparing information indicating shapes of cells selected in advance by a user with information indicating shapes of cells included in the three-dimensional image or the two-dimensional image in which the cells are scanned in the flow line direction, the imaging flow cytometers 20 and 20a determine whether they are cells to be sorted and sample the cells.

In the imaging flow cytometers 20 and 20a, the flow rate of a fluid flowing in the flow channel 21 is sufficiently low with respect to a time required for determining a sorting object and sampling.

EXAMPLES

An example in which generating (capturing) a three-dimensional image of cells using the imaging flow cytometer 20 according to the first embodiment is performed will be described below.

In this example, cells C1 which are human leukemic cells (K562 cells) in a mitotic phase were analyzed as observation objects. The cells C1 were stained with MPM-2 and DAPI, which are antimitotic protein. A suspension including the stained cells C1 at a concentration of about $1 \times 10^7$ per millimeter was used. The suspension was made to flow in the flow channel 21 provided in the imaging flow cytometer 20 at a flow rate of 10 μL/min.

Figure 21:
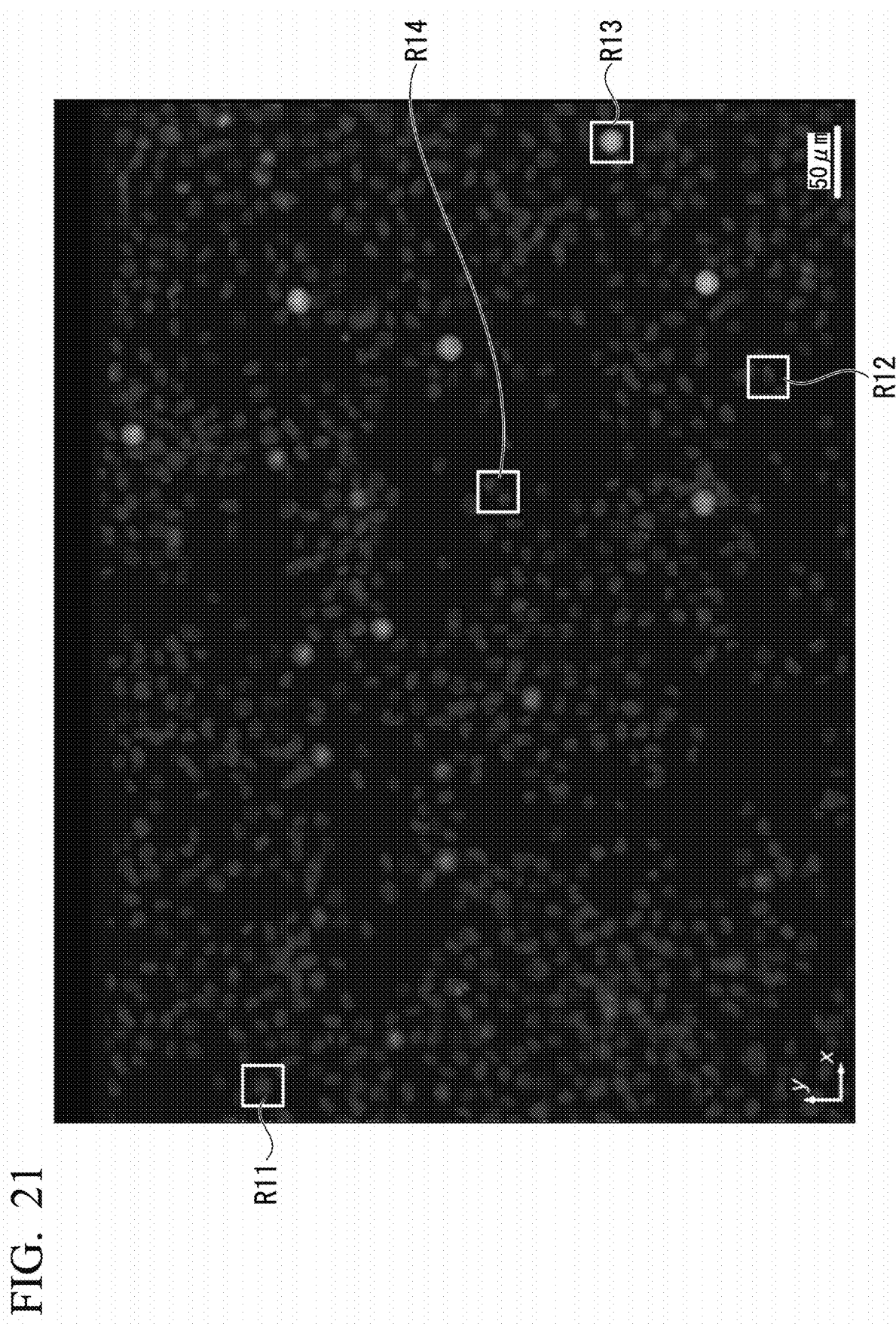
FIG. 21 is a diagram illustrating an example of an image obtained by projecting a three-dimensional image of cells to a two-dimensional plane (an xy plane) according to an example of the present invention.

FIG. 21 illustrates an image obtained by projecting a three-dimensional image of the cells C1 generated as a result of observation over 857 milliseconds using the imaging flow cytometer 20 under the aforementioned experiment conditions to a two-dimensional plane (the xy plane). The image illustrated in FIG. 21 is an image in which images of a plurality of cross sections with different positions in the z-axis direction included in the three-dimensional image are superimposed.

In the three-dimensional image illustrated in FIG. 21, 1248 cells C1 were reconstructed as the three-dimensional image. On the basis of the three-dimensional image illustrated in FIG. 21, 60 cells C1 in this parent population were determined to be positive in MPM-2. Through analysis of the three-dimensional image of the cells C1 stained with DAPI, it was determined that 34 cells C1 were in a prophase of cell division, 10 cells C1 were in a metaphase, two cells C1 were in an anaphase, and two cells C1 were in a telophase.

Figure 22:
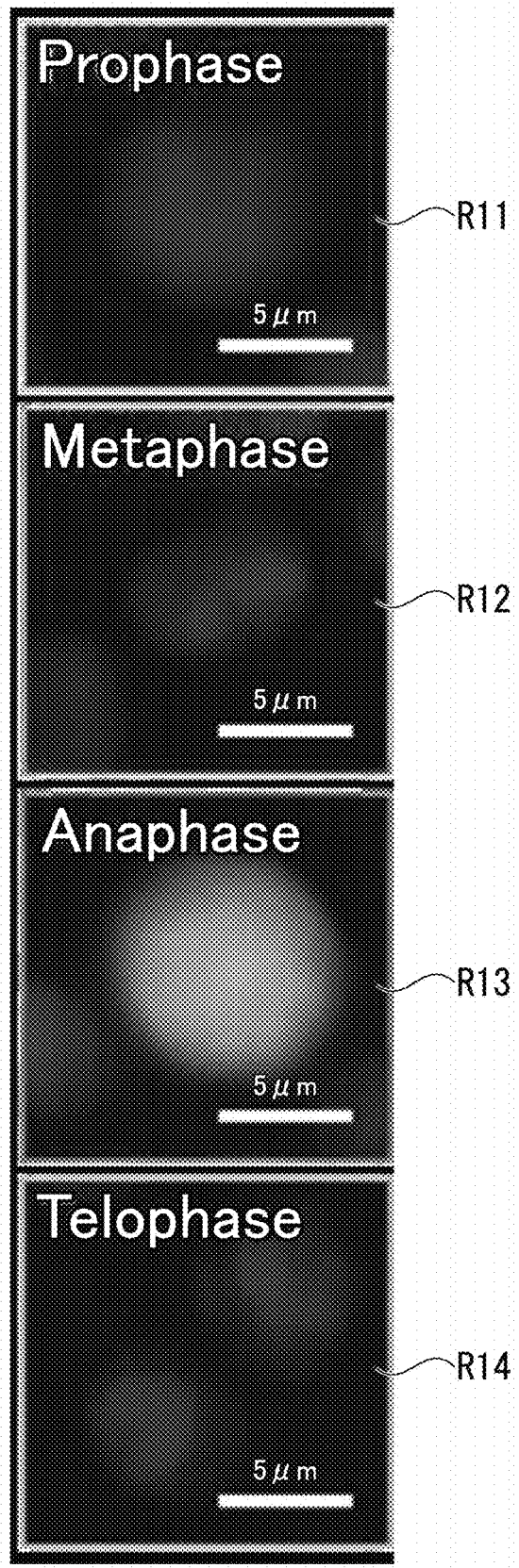
FIG. 22 is a diagram illustrating an example of enlarged views of areas in the image illustrated in FIG. 21 according to an example of the present invention.

In FIG. 21, images included in an area R11, an area R12, an area R13, and an area R14 are images of the cells C1 in the prophase, the metaphase, the anaphase, and the telophase, respectively. The images of the cells included in the area R11, the area R12, and the area R14 are images of the cells C1 stained with DAPI, respectively. The images of the cells included in the area R13 are images of the cells C1 stained with MPM-2. In FIG. 22, enlarged views of the area R11, the area R12, the area R13, and the area R14, respectively, are illustrated.

Figure 23:
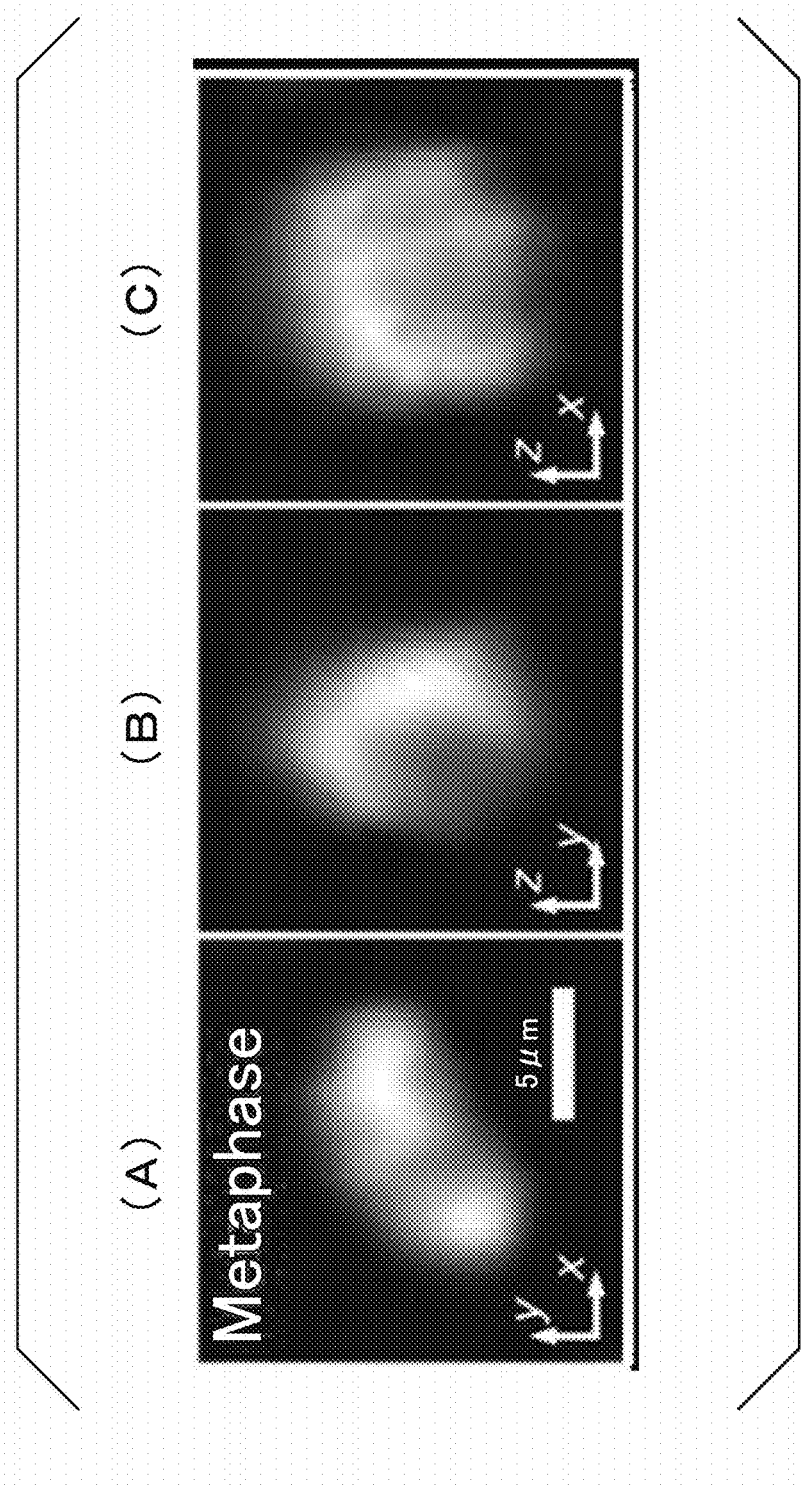
FIG. 23 is a diagram illustrating an example of an image obtained by projecting a three-dimensional image in a metaphase of cell division of cells dyed with DAPI to a two-dimensional plane according to an example of the present invention.
Figure 24:
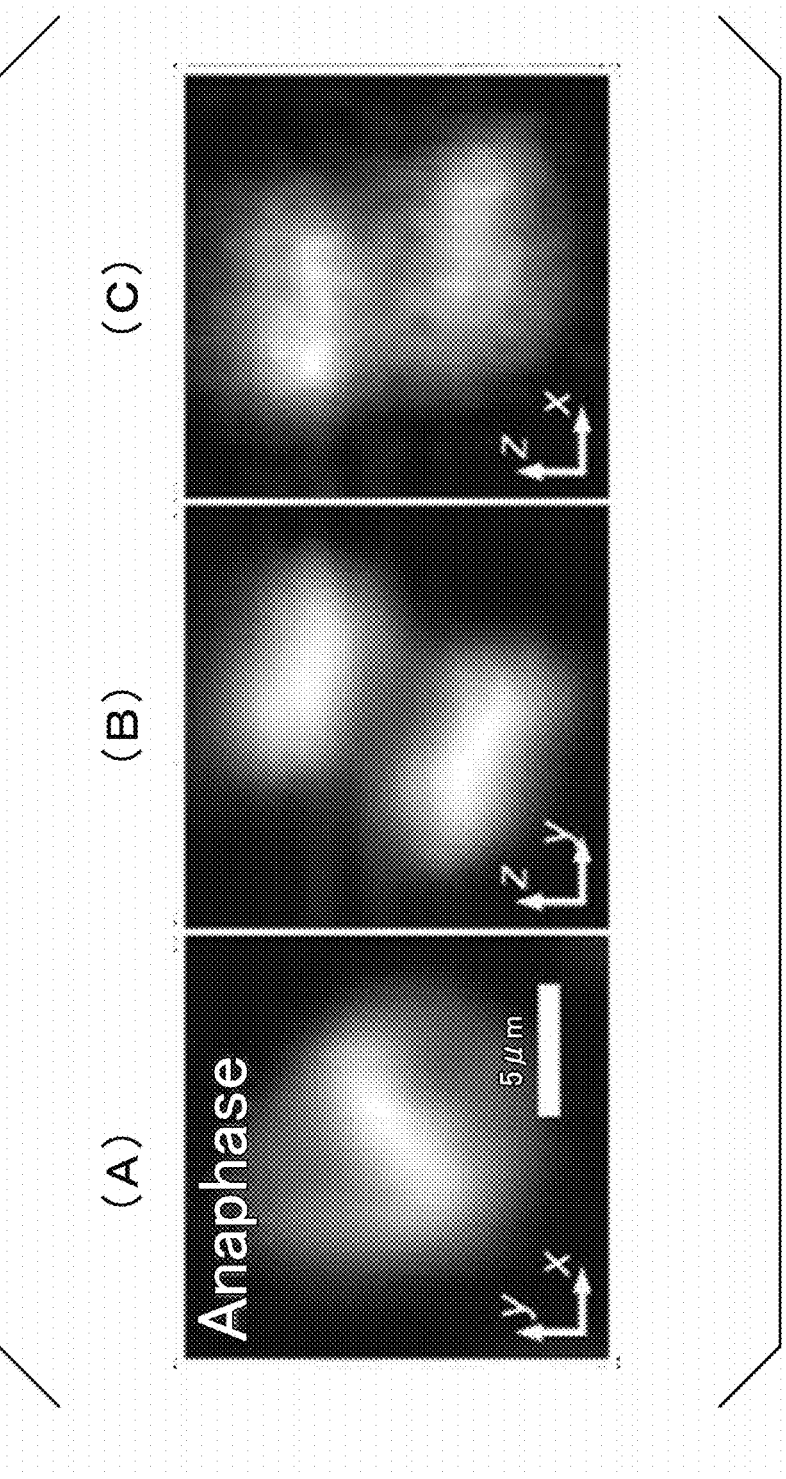
FIG. 24 is a diagram illustrating an example of an image obtained by projecting a three-dimensional image in an anaphase of cell division of cells dyed with DAPI to a two-dimensional plane according to an example of the present invention.

In FIGS. 23 and 24, images obtained by projecting a three-dimensional image of cells C1 stained with DAPI to a two-dimensional plane are illustrated in the metaphase and the anaphase of cell division, respectively. (A), (B), and (C) of FIG. 23 illustrate images of the cells C1 in the metaphase projected to the xy plane, the yz plane, and the xz plane respectively. (A), (B), and (C) of FIG. 24 illustrate images of the cells C1 in the anaphase projected to the xy plane, the yz plane, and the xz plane, respectively. Chromosome division in the images obtained by projecting the cells C1 in the anaphase to the yz plane and the xz plane, respectively, can be ascertained from (B) and (C) of FIG. 24. On the other hand, in the image obtained by projecting the cells C1 in the anaphase to the xy plane as illustrated in (A) of FIG. 24, divided chromosomes are imaged to overlap each other and it is difficult to ascertain chromosome division from the image.

The image projected to the xy plane as illustrated in (A) of FIG. 24 is an image corresponding to the two-dimensional image acquired through two-dimensional imaging in the related art. With the two-dimensional imaging according to the related art, it is difficult to generate an image from which a metaphase plate or a cell cycle such as chromosome division can be identified depending on directions of cells. On the other hand, through three-dimensional imaging using the imaging flow cytometer 20, a position in the z-axis direction of a chromosome can be identified as illustrated in (B) and (C) of FIG. 24. In this way, since the imaging flow cytometer 20 can perform three-dimensional imaging including the z-axis direction, it is possible to generate a three-dimensional image from which a metaphase plate or a cell cycle such as chromosome division can be identified.

For some cells of the cells C1, the images onto the xy plane, the y, plane, and the xz plane, respectively, are not sufficient for identifying arrangement of chromosomes to determine the telophase of cell division. An example in which arrangement of chromosomes can be identified by changing a direction in which the three-dimensional image is projected will be described below with reference to FIGS. 25 to 27.

Figure 25:
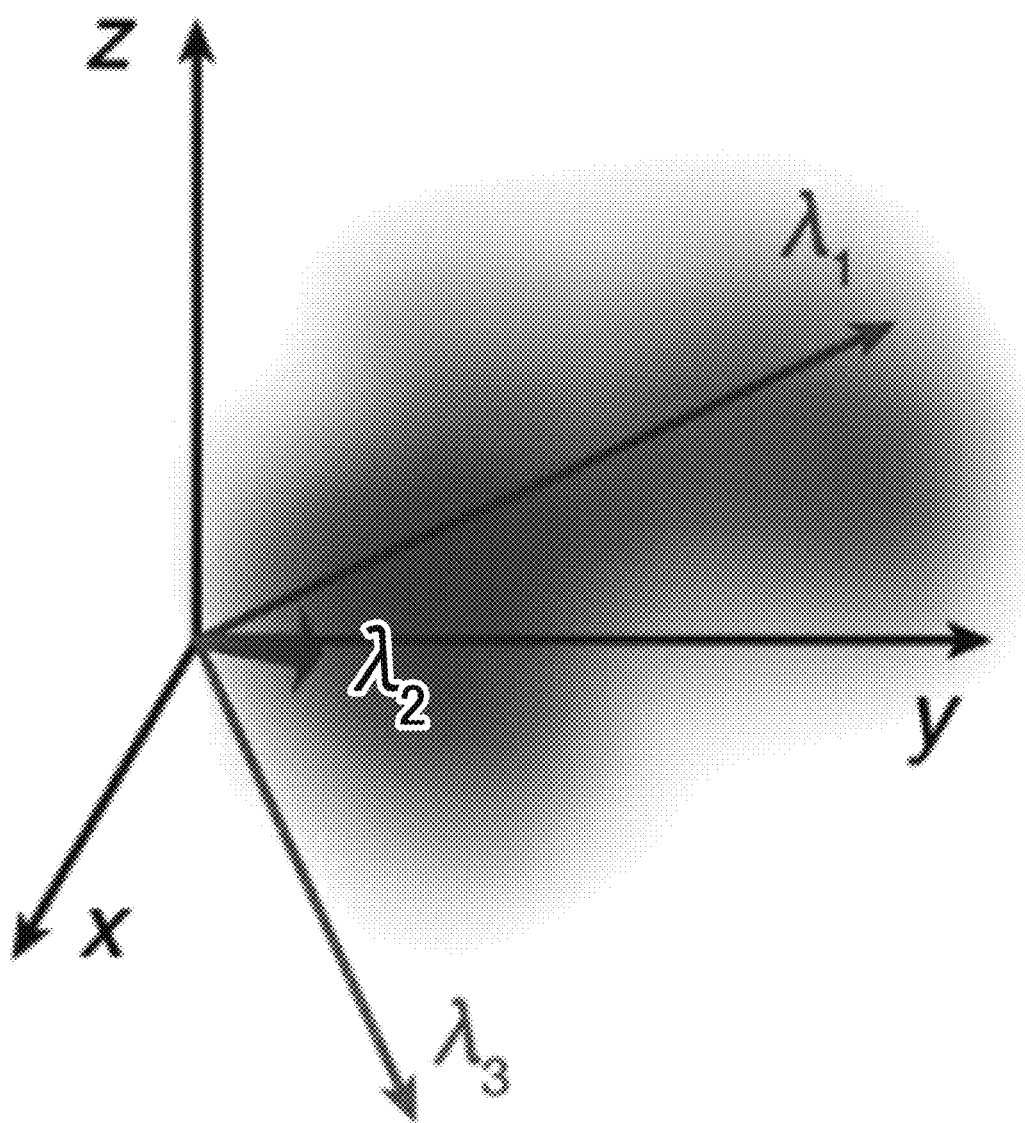
FIG. 25 is a diagram illustrating an example of an area dyed with DAPI in a three-dimensional image according to an example of the present invention.

FIG. 25 illustrates an example of an area stained with DAPI in a three-dimensional image generated by the imaging flow cytometer 20. The cell C1 is a cell in the metaphase of cell division. The x axis, the y axis, and the z axis are illustrated in FIG. 25. For example, the directions indicated by the x axis, the y axis, and the z axis correspond to the directions indicated by the coordinate axes of the xyz coordinate system illustrated in FIG. 1, respectively. In FIG. 25, a $\lambda_1$ axis, a $\lambda_2$ axis, and a $\lambda_3$ axis are illustrated along with the x axis, the y axis, and the z axis. The $\lambda_1$ axis, the $\lambda_2$ axis, and the $\lambda_3$ axis are coordinate axes obtained by rotating the x axis, the y axis, and the z axis on the basis of eigenvectors acquired through principal component analysis. Unit vectors indicating the directions of the $\lambda_1$ axis, the $\lambda_2$ axis, and the $\lambda_3$ axis are [−0.54, 0.82, 0.20], [0.71, 0.31, 0.63], and [0.45, 0.48, −0.75] in the original xyz coordinate system, respectively.

Figure 26:
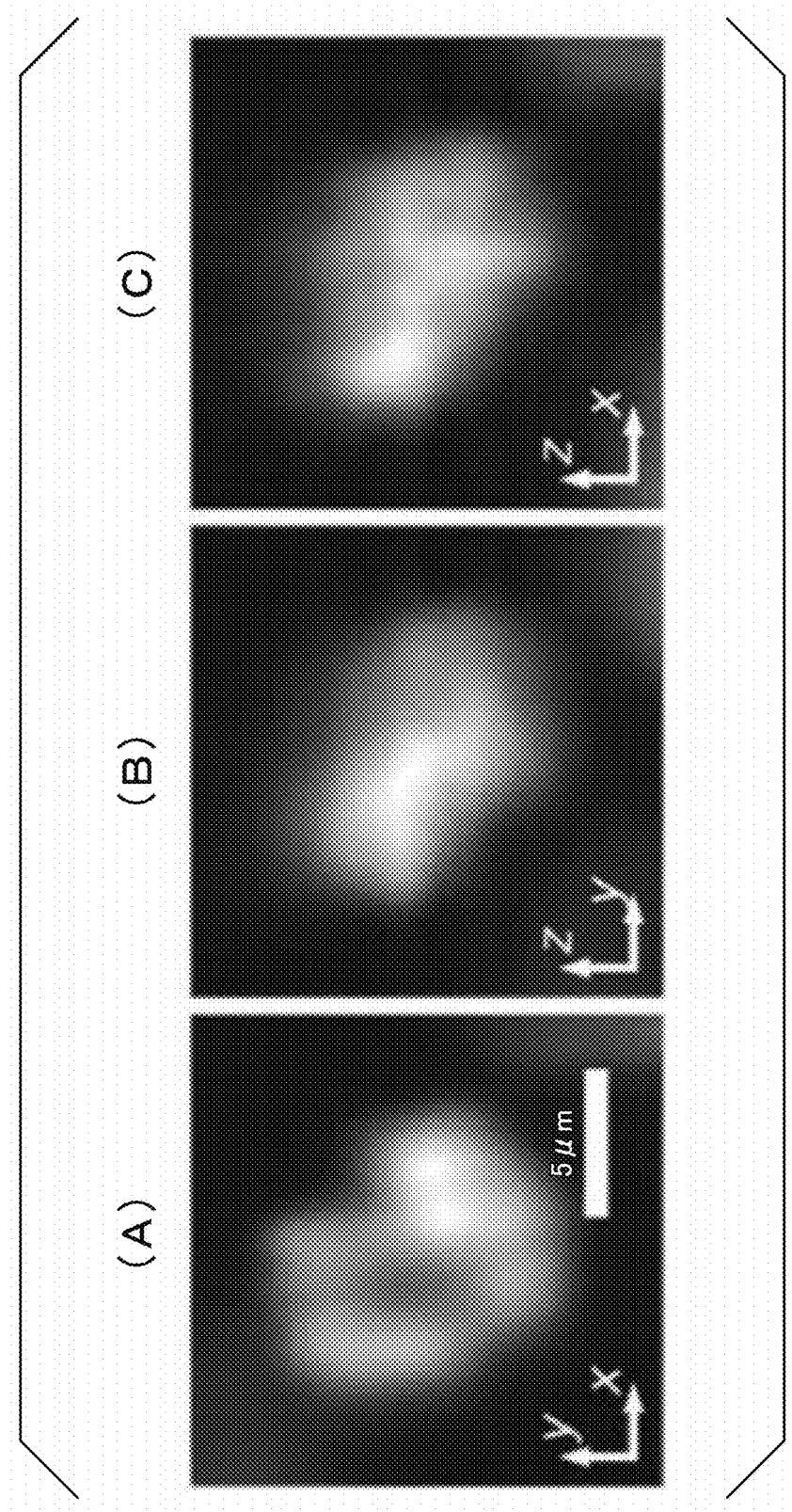
FIG. 26 is a diagram illustrating an example of two-dimensional images projected to an xy plane, a yz plane, and an xz plane, respectively, according to an example of the present invention.

When the area illustrated in FIG. 25 are projected to the xy plane, the yz plane, and the xz plane, respectively, a two-dimensional image illustrated in FIG. 26 is obtained. As illustrated in (A), (B), and (C) of FIG. 26, it is difficult to identify arrangement of chromosomes in the two-dimensional images of the xy plane, the yz plane, and the xz plane.

Figure 27:
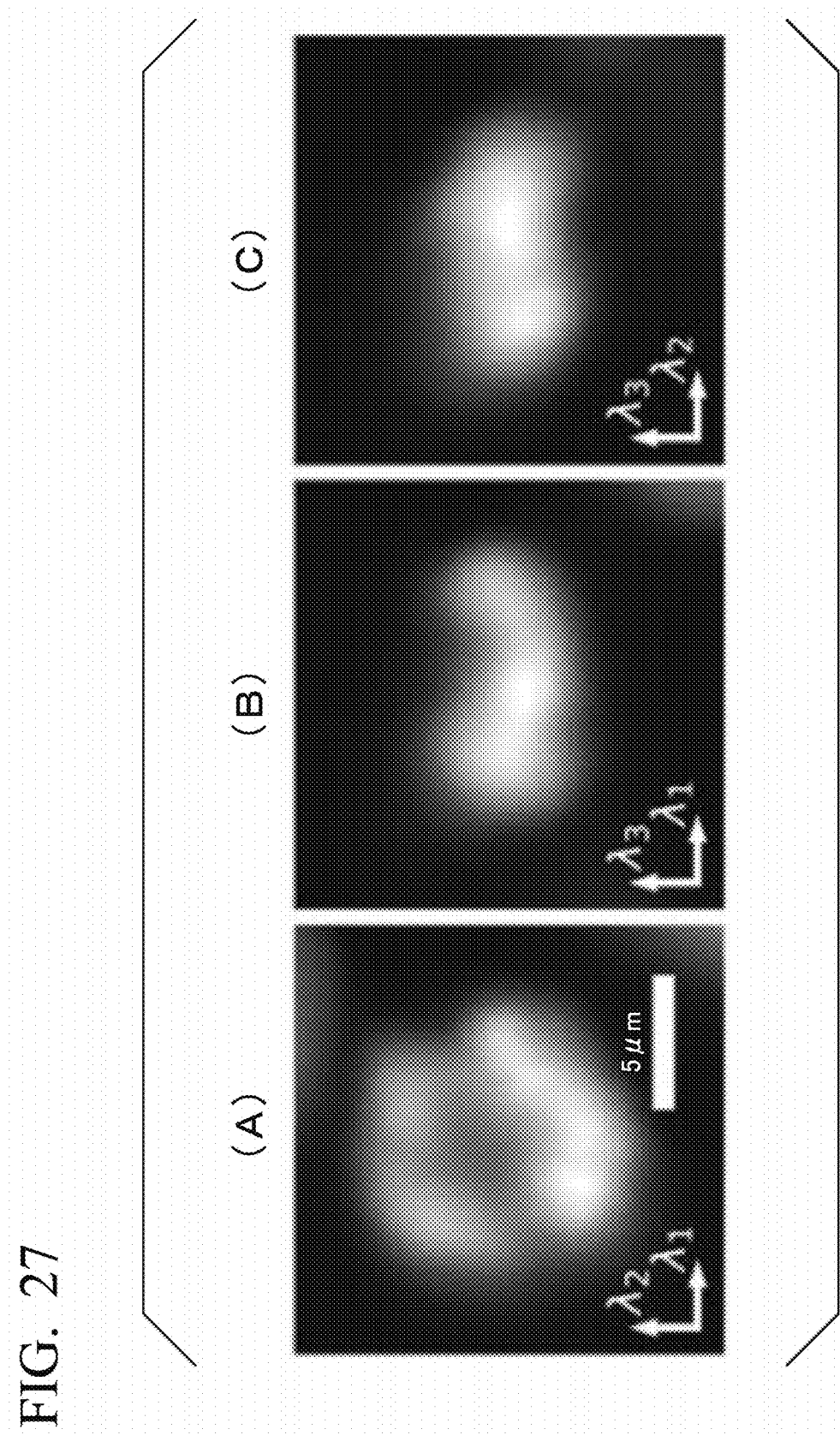
FIG. 27 is a diagram illustrating an example of a two-dimensional image obtained by rotating a coordinate axis to a coordinate axis acquired through principal component analysis according to an example of the present invention.

FIG. 27 illustrates two-dimensional images when the area illustrated in FIG. 25 is projected to the planes by rotating the x axis, the y axis, and the z axis to the $\lambda_1$ axis, the $\lambda_2$ axis, and the $\lambda_3$ axis. (A), (B), and (C) of FIG. 27 illustrate two-dimensional images projected to a $\lambda_1\lambda_2$ plane, a $\lambda_1\lambda_3$ plane, and a $\lambda_2\lambda_3$ plane, respectively. Arrangement of chromosomes can be identified in (A) of FIG. 27.

Since the imaging flow cytometer 20 generates a three-dimensional image, it is possible to select a direction in which the three-dimensional image is projected to a two-dimensional image for the purpose of identifying a structure of an observation object. Selecting of a projection direction is possible because the imaging flow cytometer 20 generates the three-dimensional image. When a two-dimensional image or two-dimensional images corresponding to a plurality of predetermined directions, respectively, are generated, the projection direction cannot be selected in the stage of analysis after the images have been generated.

Figure 28:
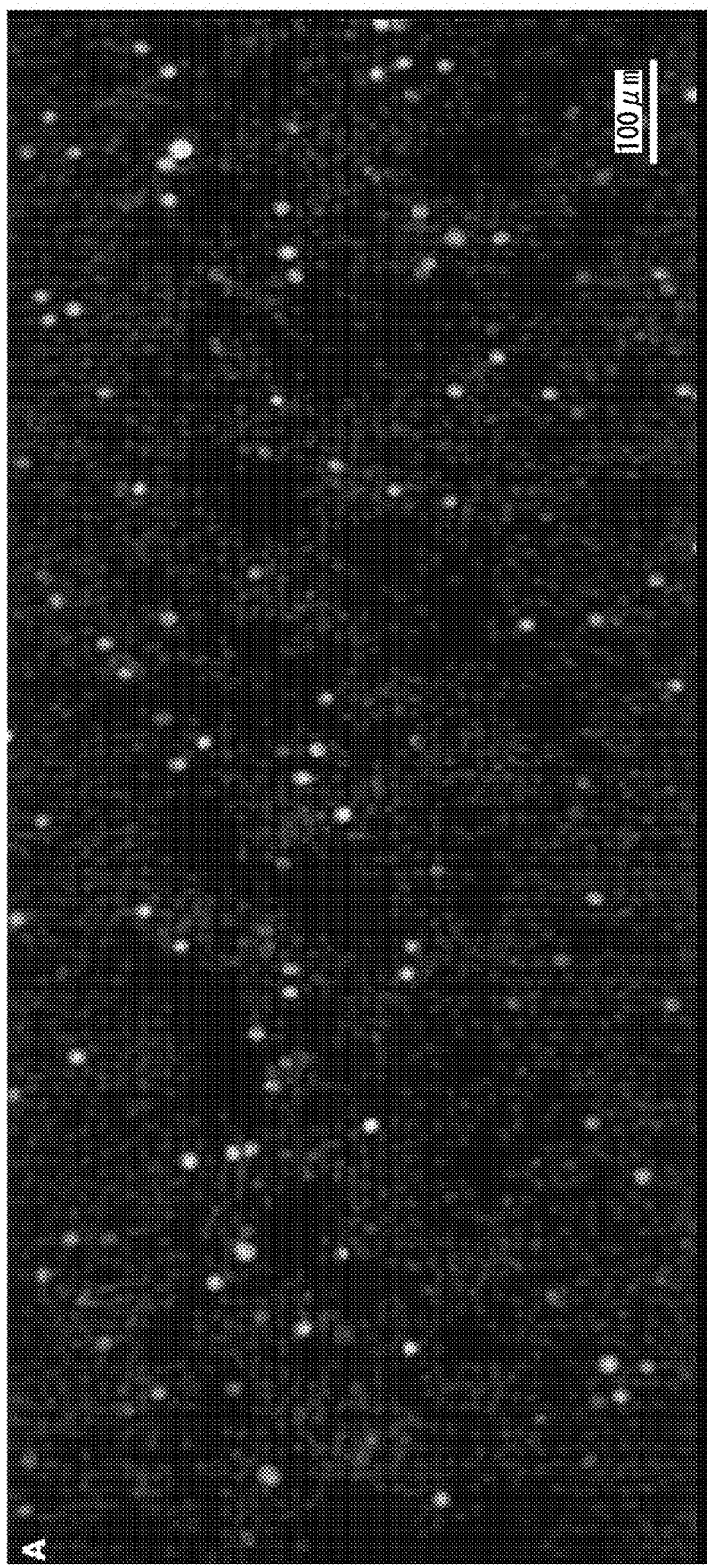
FIG. 28 is a diagram illustrating an example of a three-dimensional image in a wide range according to an example of the present invention.

FIG. 28 illustrates an analysis result of a three-dimensional image in a wider range than the range captured in the image illustrated in FIG. 21. In FIG. 28, a three-dimensional image of $10^5$-order cells C1 flowing in the flow channel 21 is generated by the imaging flow cytometer 20. The cells C1 are stained with MPM-2 or DAPI. In the obtained three-dimensional image, images of 408937 cells C1 are detected in the total imaging time of 286 seconds. The image illustrated in FIG. 28 is an image obtained by projecting a three-dimensional image of 1% of the total cells C1 stained with MPM-2 and DAPI to a two-dimensional plane (the xy plane). The image is obtained by projecting the three-dimensional image to the xy plane. In the image illustrated in FIG. 28, a plurality of images of cross sections with different positions in the z-axis direction included in the three-dimensional image are displayed to overlap each other. A scale bar represents a length of 100 μm.

Figure 29:
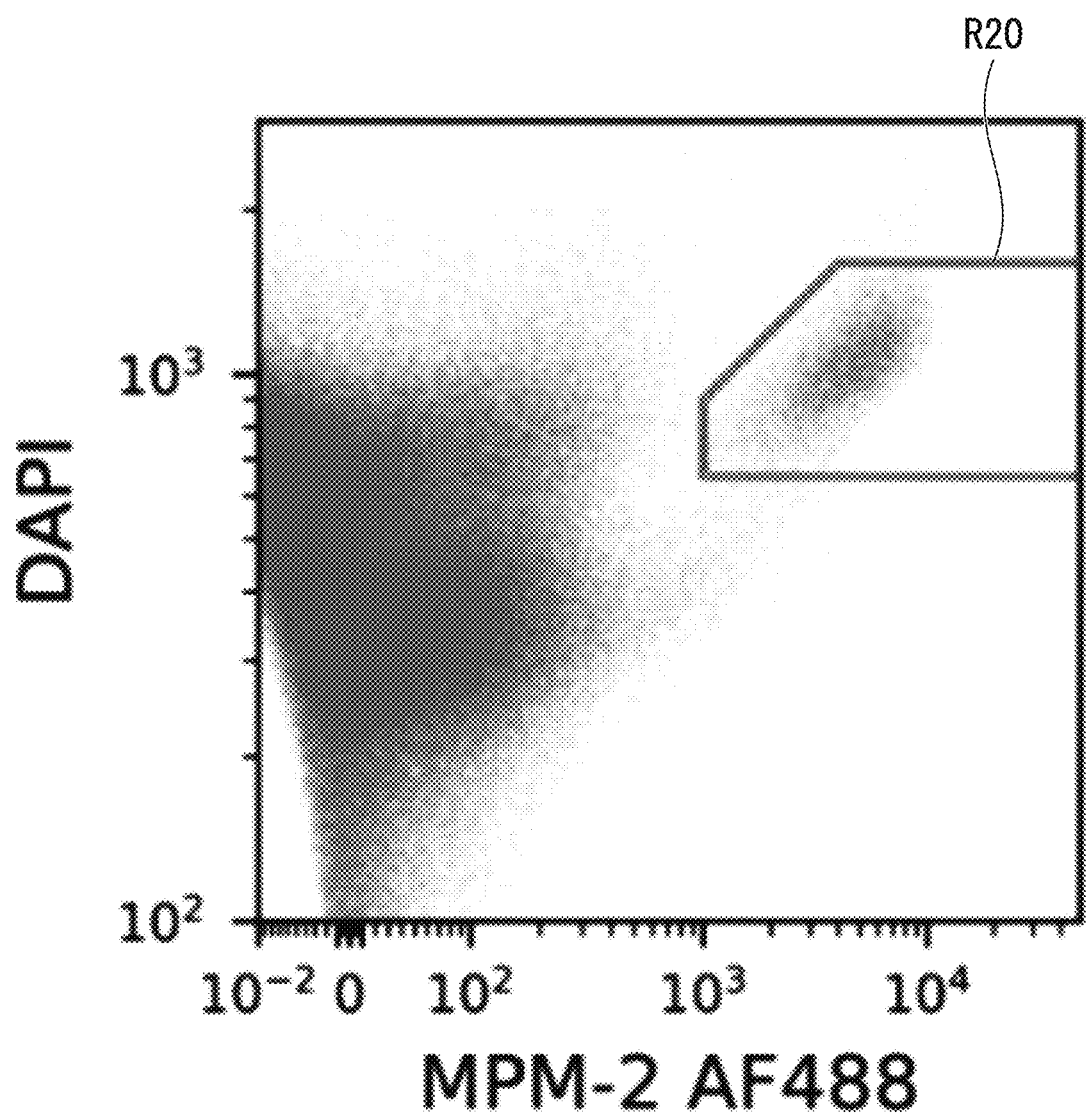
FIG. 29 is a diagram illustrating an example of a scatter diagram indicating an analysis result of intensities of MPM-2 and DAPI according to an example of the present invention.

First, intensities of MPM-2 and DAPI for the cells C1 were analyzed, respectively. FIG. 29 is a scatter diagram illustrating the result of analysis. Through this analysis, MPM-2-positive cells C1 were selected. An area R20 indicates the selected MPM-2-positive cells C1.

Figure 30:
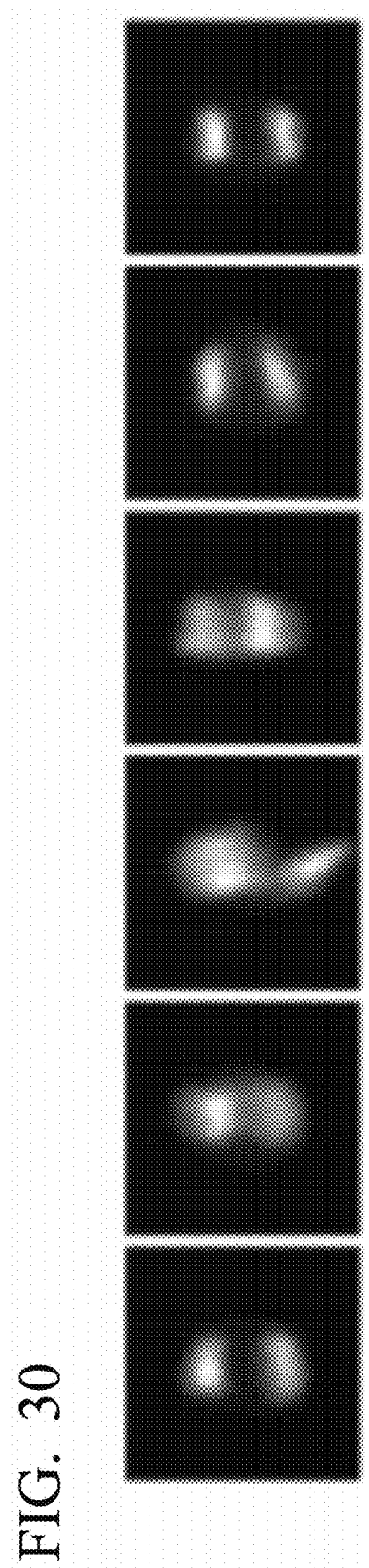
FIG. 30 is a diagram illustrating an example of a two-dimensional image obtained by projecting a three-dimensional image of two DAPI-dyed areas to an xy plane according to an example of the present invention.

Then, the number of areas stained with DAPI in the cells C1 was measured in the area R20. As the result of measurement, two areas stained with DAPI were measured. FIG. 30 illustrates two-dimensional images obtained by projecting the three-dimensional images in the two areas stained with DAPI to the xy plane. The anaphase or telophase of cell division was determined from the images illustrated in FIG. 30.

For the cells C1 having only one area stained with DAPI, an aspect ratio of the area was calculated from the three-dimensional image. Two-dimensional images obtained by projecting a three-dimensional image of one area stained with DAPI to a plane are illustrated in (A) of FIG. 31. In (A) of FIG. 31, a plane onto which the three-dimensional image was projected was selected such that a major axis and a minor axis of the area stained with DAPI match the vertical axis and the horizontal axis, respectively.

Figure 31:
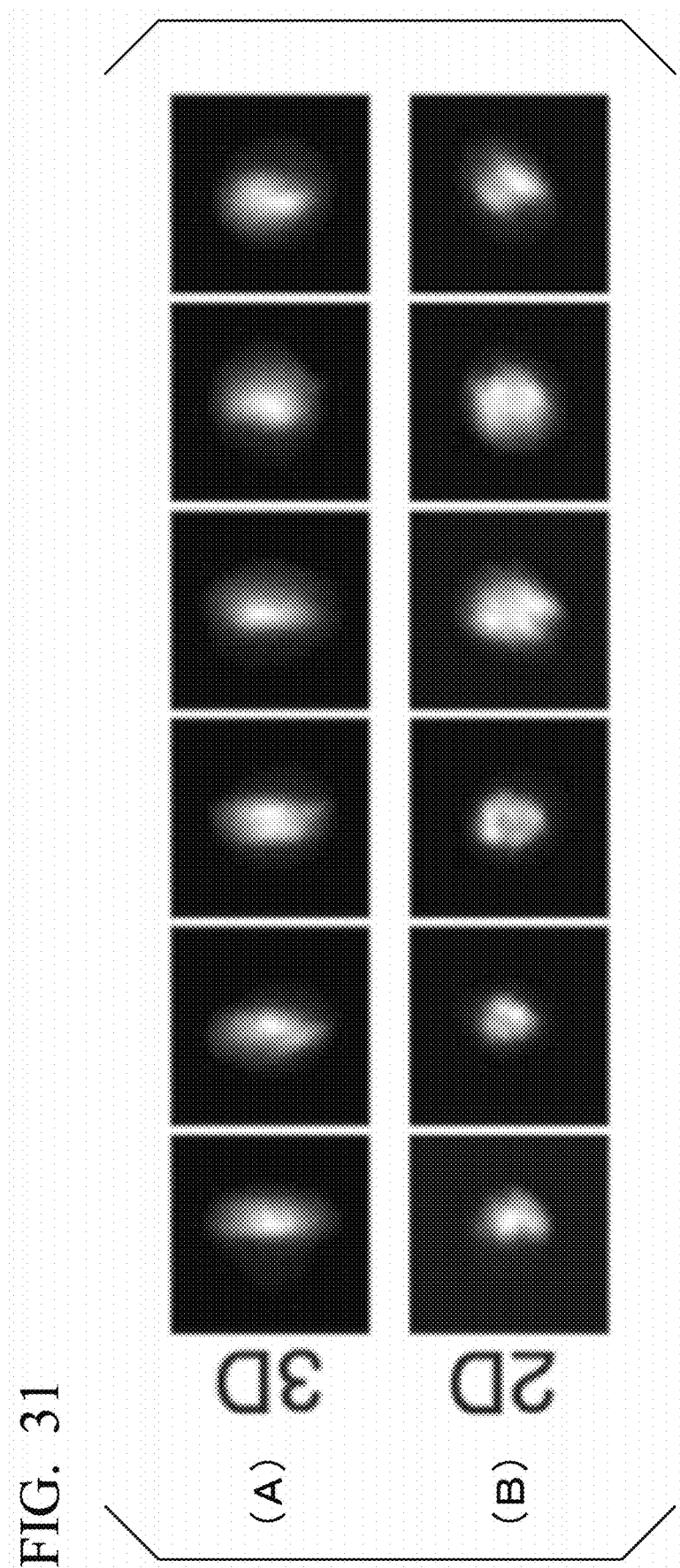
FIG. 31 is a diagram illustrating an example of a two-dimensional image obtained by projecting a three-dimensional image of one DAPI-dyed area to a plane according to an example of the present invention.

For the purpose of comparison, two-dimensional images obtained by projecting the three-dimensional image of one area stained with DAPI to the xy plane are illustrated in (B) of FIG. 31. The two-dimensional images illustrated in (B) of FIG. 31 are imitations of the two-dimensional images generated through imaging flow cytometry in which two-dimensional imaging is performed. That is, the two-dimensional images illustrated in (B) of FIG. 31 are images corresponding to two-dimensional imaging.

In the area stained with DAPI illustrated in (B) of FIG. 31, the aspect ratio is greater than that of the area stained with DAPI illustrated in (A) of FIG. 31.

Figure 32:
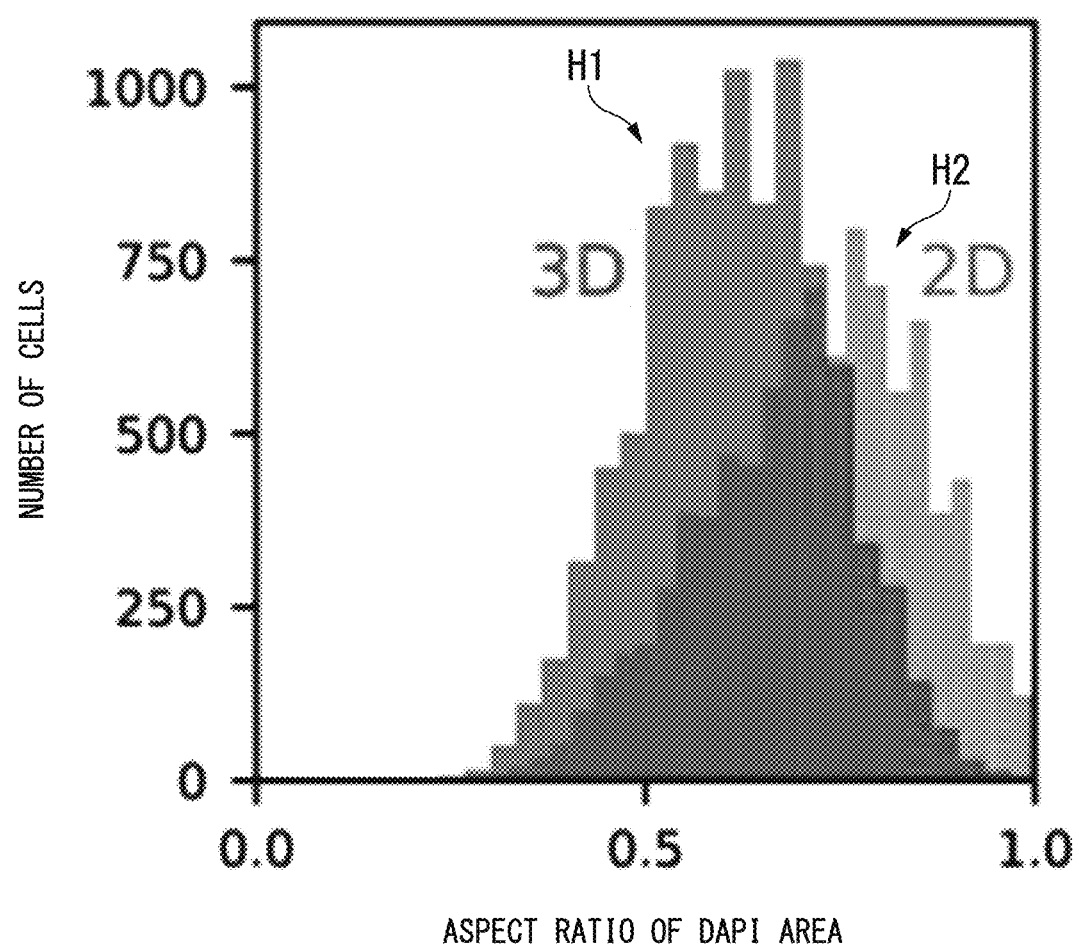
FIG. 32 is a diagram illustrating an example of a comparison result of an aspect ratio of a DAPI area between an image obtained by three-dimensional imaging and an image obtained by two-dimensional imaging according to an example of the present invention.

The aspect ratio calculated from the images based on three-dimensional imaging as illustrated in (A) of FIG. 31 and the aspect ratio calculated from the images based on two-dimensional imaging as illustrated in (B) of FIG. 31 were compared. The result of comparison is illustrated in FIG. 32. Histograms indicating a distribution of aspect ratios of the DAPI areas for a plurality of cells are illustrated in FIG. 32. The histogram H1 indicates the aspect ratios acquired from the images based on three-dimensional imaging. The histogram H2 indicates the aspect ratios acquired from the images based on two-dimensional imaging. It can be seen from FIG. 32 that the aspect ratio in the images based on two-dimensional imaging tends to be calculated greater than in the images based on three-dimensional imaging. This tendency is considered to be due to the number of dimensions in two-dimensional imaging being smaller than the number of dimensions in three-dimensional imaging. Accordingly, three-dimensional imaging at a high throughput is thought to be useful for accurately obtaining a structural profile of a cell. The imaging flow cytometer 20 enables such three-dimensional imaging.

While embodiments of the present invention have been described above in detail with reference to the drawings, the specific configuration thereof is not limited to the above-described configurations and can be appropriately modified without departing from the gist of the present invention.

Each of the aforementioned devices has a computer therein. The operation performed by the device is stored in a computer-readable recording medium in the form of a program, and the operation is performed by causing the computer to read and execute the program. Examples of the computer-readable recording medium include a magnetic disk, a magneto-optical disc, a CD-ROM, a DVD-ROM, and a semiconductor memory. The computer program may be transmitted to the computers via a communication line, and the computer may execute the transmitted program.

The programs may be for realizing some of the aforementioned functions. The programs may be a program that can realize the aforementioned functions in combination with a program stored in advance in a computer system, that is, a so-called differential file (a differential program).

REFERENCE SIGNS LIST 20, 20a Imaging flow cytometer
21 Flow channel
22 Acoustic device
27, 27b Light source
23 Imaging unit
26 Three-dimensional image-generating unit
26a Two-dimensional image-generating unit
CL Cell
LS, LSb Illumination light
AW Acoustic wave
PIC Cross-sectional image
PLC Line image

The invention claimed is:
1. An imaging flow cytometer, comprising:
a flow channel in which an observation object flows and a length in a width direction is longer than a length in a height direction such that a flow rate distribution in the width direction is constant regardless of positions within the flow channel in the width direction except for the vicinity of walls of the flow channel;
an acoustic element configured to apply acoustic waves as standing waves to the flow channel;
a light source configured to irradiate the flow channel with illumination light;
an image sensor configured to image at least a line included in a cross section of the observation object crossing a flow line direction which is a direction in which the observation object flows in the flow channel by measuring or imaging the observation object passing through a position irradiated with the illumination light; and scanned image-generating circuitry configured to generate an image in which the observation object is scanned in the flow line direction on the basis of a plurality of captured images acquired by the image sensor imaging the line in a time series, wherein the acoustic element is configured to apply the acoustic waves as the standing waves to the flow channel such that rotation of the observation object does not occur during a process of imaging by the image sensor.

2. The imaging flow cytometer according to claim 1, wherein the number of nodes of the standing waves in the height direction is one, and the number of nodes of the standing waves in the width direction is zero.

3. The imaging flow cytometer according to claim 1, wherein the number of nodes of the standing waves in the height direction is one, and the number of nodes of the standing waves in the width direction is one or more.

4. The imaging flow cytometer according to claim 1, wherein a plurality of the observation objects are arranged in the width direction flow in the flow channel.

5. The imaging flow cytometer according to claim 1, wherein the imaging flow cytometer sets a flow rate of a fluid flowing in the flow channel according to the image sensor.

6. The imaging flow cytometer according to claim 1, wherein the acoustic element and the image sensor have a distance therebetween in the length direction of the flow channel such that alignment of a plurality of the observation objects due to a sound effect of the acoustic waves from the acoustic element is maintained.

7. The imaging flow cytometer according to claim 1, wherein the number of nodes of the standing waves of the acoustic waves in the height direction of the flow channel is a predetermined number, the image sensor has a plurality of pixel arrays, and the image sensor images the observation object using only pixel arrays of the plurality of pixel arrays corresponding to positions of one or more nodes of the standing waves of the acoustic waves in the height direction of the flow channel.

\* \* \* \* \*